(12) United States Patent
Brunner et al.

(10) Patent No.: US 7,860,852 B2
(45) Date of Patent: Dec. 28, 2010

(54) SYSTEMS AND APPARATUSES FOR SEAMLESS INTEGRATION OF USER, CONTEXTUAL, AND SOCIALLY AWARE SEARCH UTILIZING LAYERED APPROACH

(76) Inventors: Josie C. Brunner, 905 Southshore Pkwy., Durham, NC (US) 27703;
Andrew T. Brunner, 905 Southshore Pkwy., Durham, NC (US) 27703

( * ) Notice: Subject to any disclaimer, the term of this patent is extended or adjusted under 35 U.S.C. 154(b) by 564 days.

(21) Appl. No.: 11/927,699

(22) Filed: Oct. 30, 2007

(65) Prior Publication Data
US 2009/0055355 A1    Feb. 26, 2009

Related U.S. Application Data

(63) Continuation-in-part of application No. 11/691,553, filed on Mar. 27, 2007, now Pat. No. 7,720,843.

(51) Int. Cl.
*G06F 7/00* (2006.01)
*G06F 17/00* (2006.01)

(52) U.S. Cl. .................. 707/706; 707/722; 707/770; 707/771; 707/781

(58) Field of Classification Search .................. None
See application file for complete search history.

(56) References Cited

U.S. PATENT DOCUMENTS

| | | |
|---|---|---|
| 2004/0030706 A1* | 2/2004 | Evans .......................... 707/100 |
| 2007/0027903 A1* | 2/2007 | Evans et al. .................. 707/102 |
| 2007/0233692 A1* | 10/2007 | Lisa et al. ..................... 707/10 |

* cited by examiner

*Primary Examiner*—Mohammad Ali
*Assistant Examiner*—Angelica Ruiz

(57) ABSTRACT

Systems and apparatuses for providing contextual and social awareness in search results through a layer approach are herein disclosed. Awareness in search results is provided through one or more search layers, result operational layer, an interactive result layer, and loopback feedback among embodied layers. Specifically, the system provides collective and contextual intelligence to the presentation of search results. The present invention establishes end-user awareness by way of user layer, contextual awareness by way of session layer, and group awareness by way of group layer. Each layer can work independently of one another or can be integrated for further utility. Further provided are methods of search layer lens, search layer bins, and search layer funneling. The present invention also provides apparatuses providing contextual, end-user, social awareness, or combination thereof for search to be utilized by methods disclosed herein.

64 Claims, 12 Drawing Sheets

| User ID (702) | Session ID (704) | Sub-Session ID (706) | Query Order (708) | Query String (710) | Result ID (712) | ROL Result Order (714) | Interaction (716) | |
|---|---|---|---|---|---|---|---|---|
| 121 | 10 | 101 | 1 | Martin Luther | 1234 | 1 | None | |
| | | | | | 1235 | 2 | Delete | 718 |
| | | | | | 1236 | 3 | Delete | 720 |
| | | | | | 1237 | 4 | None | |
| | | | | | 1238 | 5 | None | |
| | | 102 | 2 | Protestant Reformation | 1236 | 1 | None | 724 |
| | | | | | 1239 | 2 | None | |
| | | | | | 1240 | 3 | Delete | 726 |
| | | | | | 1241 | 4 | None | |
| | | | | | 1242 | 5 | None | |
| | 20 | Null | 3 | History Catholicism | 1240 | 1 | None | 728 |
| | | | | | 1243 | 2 | Delete | 730 |
| | | | | | 1244 | 3 | None | |
| | | | | | 1245 | 4 | None | |
| | | | | | 1246 | 5 | None | |
| | | | 4 | Catholic Church Germany | 1235 | 1 | None | 732 |
| | | | | | 1243 | Suppress | Not Applicable | 734 |
| | | | | | 1234 | 2 | None | |
| | | | | | 1240 | 3 | None | 736 |
| | | | | | 1247 | 4 | None | |

FIG. 7

| Session_ID 802 | Query String 804 | Results 806 | Avg. Ratings 808 | # Ratings 810 | Display 812 | |
|---|---|---|---|---|---|---|
| Mustang | Leak Brake Hose Line | R1 | 3.4 | 106 | R5 | |
| | | R2 | 2.1 | 89 | R4 | |
| | | R3 | 1.6 | 46 | R1 | |
| | | R4 | 4.7 | 121 | R2 | 814 |
| | | R5 | 4.8 | 127 | R3 | 816 |
| Corvette | Leak Brake Hose Line | R1 | 3.8 | 48 | R2 | |
| | | R2 | 4.9 | 66 | R3 | 818 |
| | | R3 | 4.4 | 53 | R1 | 820 |
| | | R4 | 1.6 | 97 | R5 | |
| | | R5 | 1.9 | 46 | R4 | |

Fig. 8

| Session_ID 902 | Profile 904 | Qualification 906 | Rating A 908 | Rating B 910 | Rating C 912 | |
|---|---|---|---|---|---|---|
| 101 | Mustang | Yes | 3 | 5 | 5 | 914 |
| 102 | Mustang | Yes | 2 | 4 | 5 | 916 |
| 103 | Stealth | No | 5 | 5 | 5 | |
| 104 | Corvette | No | 5 | 5 | 3 | |
| 105 | Stealth | No | 4 | 5 | 4 | |
| 106 | Mustang | Yes | 1 | 4 | 4 | 918 |
| 107 | Corvette | No | 5 | 5 | 3 | |
| 108 | Mustang | Yes | 1 | 5 | 5 | 920 |
| 109 | Mustang | Yes | 3 | 2 | 4 | 922 |
| 110 | Stealth | No | 5 | 5 | 5 | |
| | | Average Total | 3.4 | 4.5 | 4.3 | 924 |
| | | Average Yes | 2 | 4 | 4.6 | 926 |

Fig. 9

| Group ID 1202 | User ID 1204 | ROL Results 1 1206 | Interactions 1 1208 | ROL Results 2 1210 | Interaction 2 1212 | ROL Results 3 1214 | |
|---|---|---|---|---|---|---|---|
| ABC | Ted | R1 | delete | | | R5 comment | 1216 |
| | | R2 | delete | | | R3 | 1218 |
| | | R3 | | | | R4 | |
| | | R4 | | | | | |
| | | R5 | Rank 1 comment | | | | 1220 |
| | Ned | | | R5 comment | Denied | | |
| | | | | R3 | Denied | | |
| | | | | R4 | Denied | | |
| XYZ | Jan | R1 | | | | R1 comment | 1222 |
| | | R2 | | | | R5 | |
| | | R3 | delete | | | | 1224 |
| | | R4 | delete | | | | 1226 |
| | | R5 | | | | | |
| | Fran | | | R1 | comment | | 1228 |
| | | | | R2 | delete | | 1230 |
| | | | | R5 | | | 1232 |

Fig. 12

SYSTEMS AND APPARATUSES FOR SEAMLESS INTEGRATION OF USER, CONTEXTUAL, AND SOCIALLY AWARE SEARCH UTILIZING LAYERED APPROACH

CROSS-REFERENCE TO RELATED APPLICATION

Continuation-in-part (CIP) of a U.S. patent application entitled: SYSTEM AND METHOD TO FACILITATE REAL-TIME END-USER AWARENESS IN QUERY RESULTS THROUGH LAYER APPROACH UTILIZING END-USER INTERACTION, LOOPBACK FEEDBACK, AND AUTOMATIC RESULT FEEDER, Ser. No. 11/691,553 filed on Mar. 27, 2007 now U.S. Pat. No. 7,720,843, the contents of which are hereby incorporated in reference.

FEDERALLY SPONSORED RESEARCH OR DEVELOPMENT

Not Applicable.

FIELD OF INVENTION

The present invention relates to optimizing and refining search results generated by computer systems, and more particularly to systems and apparatuses facilitating seamless integration for search providing user, contextual, and social awareness in search results through layered approach.

BACKGROUND OF THE INVENTION

With the Web 2.0 movement, more people are supplying content, and more means are being established to share content. People are trying to provide content in ways others will find useful. More content is being digitalized so it can be shared electronically. As search systems increase in size and complexity, queries tend to generate more results than the typical information seeker can effectively go through to find the best or desired results. Typical returned result sets for queries contain "noise", results that are not deemed relevant, significant, and/or content-laden by the end-user. There is a need to eliminate noise so end-users can effectively and efficiently go through search results. Furthermore, as electronic data transfer and communication become more complex, there are more items that can be searched using computer-implemented methods. The intent of an end-user's search may include finding items that are located in a variety of places (e.g., user's desktop, client, document, on database located on another server, on the Internet, etc.) and can be in many types (e.g., text, images, file directories, audio, video, web pages, email addresses, IM accounts, files, etc.). The application of many search systems can also produce more noise, and the process may require more time and energy for the end-user to conduct search. Avenues to reduce noise, especially in integrated search systems, included the introduction of better "intent-driven" search, the application of social awareness in search systems, and the utilization of intelligence systems, including contextual and collective intelligence.

Many "intent-driven" approaches to optimizing search results focus on refining queries to hone in on the content searchers want. "End-user intent" is defined herein as the goal or purpose of end-user in submitting a search query or plurality of queries to a result provider in attempt to obtain results to help said end-user meet said goal or purpose. An example of such techniques is providing a query session that utilizes additional prompts before and/or after an initial query to narrow result sets returned. These approaches have generally been applied, for example, to web searches focused on one product, such as homes, jobs, or personal vehicles. Users may select search (query) criteria from pre-selected categories. To further optimize search, some systems allow pseudo "persistent" searches, commonly referred to as "saved searches". A "saved" search generally only allows users to save search (query) criteria without having to re-enter the criteria in the prompts. Such searches generally do not allow for further refinement of items though interactions, such as "delete". "Saved" searches require users to reissue the same query and, therefore are not truly "persistent". "Persistent" searches are similar to "channels" or RSS streams, discussed herein. While current "saved" search is most suitable for systems with only one goal, such as finding property or a vehicle, it is not practical in situations where the relationship of items searched to the intent of query issued is only easily known by the end-user issuing the queries. For example, in a search for a "wedding gift", multiple, independent searches may be performed that through keywords in the queries seem unrelated, but, through the intent of the end-user, are more apparent. Saving the queries alone is not as helpful to the end-user who might be evaluating a wide range of items whose relevance is only truly deciphered by the end-user.

Current search systems are limited to query-based sessions, which do not allow the incorporation of influence of multiple, seemingly disparate queries aimed at the same purpose or project. In other words, current search systems fail to capture user intent outside of queries issued. While actual keywords in queries are vital in knowing the subject matter of the search, they do not necessarily capture the intent or larger goals of the queries. Seemingly different queries (e.g., different keywords) are not able to work in conjunction to optimize and refine search.

When queries do pivot around keywords or other item attributes, such as time posted or source's geographical location, then query sessions are practical. However, current systems and methods are usually based on a "natural progression" of refining queries themselves to extract a smaller result set that better fits the intention of the end-user. These methods begin with an initial query and build a result set from there. These methods are tied to the result provider itself and ultimately can only produce one result set to the string of queries. Structured query refining methods try to imitate the flow of logic of a generic, "all-encompassing" end-user. However, these often rigid, pre-structured query sessions limit the freedom of the end-user to link queries by how she intends the queries to be associated. There is a need for more flexible search refining methods to provide an end-user the ability to associate and structure multiple queries based on her particular intent.

One query session approach is employed by Aware Search by Stottler Henke Associates, Inc., of San Mateo, Calif. The Aware Search client allows users to rate an item as "good" or "bad" and weigh key terms. This enables the system to refine results for the end-user even after the initial query is sent. Users are able to organize searches (queries) into folders; however, each search is independently understood by Aware. While projects are organized in familiar folders, "awareness" is not shared among a project, i.e., grouped searches (queries). Results may again appear in another query within the same project the end-user has already rated "bad". Interactions cannot be combined within a whole project to reflect the end-user's overall intent for the grouped queries. In other words, while queries can be organized around the end-user's categorization of each query, evaluations on individual results cannot cross queries and be used within the same project.

Organizing search results based on query alone is insufficient to ensure that a particular result meets the intention of said end-user. For example, a query of "Martin Luther", the German monk, could return results related to "Martin Luther King", an American Civil Rights leader. Currently, one can refine said search for that particular query. However, if the end-user issues another query that shares no similar keywords with the first query, "Martin Luther", such as "Protestant Reformation", the query must currently be independently refined. The end-user cannot apply the interactions to particular results in the first query to results in the second query. Furthermore, if a third query is issued without any similar keywords, such as "Catholic Church", the end-user is not able to link this query with either of the previous two. The end-user has a specific application for the information in which the search is intended. Storing information based on query alone will not capture end-user's intent.

Productivity is also to be gained by dividing search among a plurality of searchers utilizing the same information system. For example, searchers within the same organization, but different working groups, may access the same databases and share the same files, but apply those files to specific, independent projects. There is currently need to optimize searches for specific use without destroying the integrity of the information for others' use. For example, a marketing firm may have a database of photos to be utilized by its employees for ad campaigns. Currently, employees searching for files might save specific files they require in their own project folders. In their search, they cannot delete files they are not interested in using without deleting the actual file in the database. Deleting such files could present problems to other users who might require access to those same files.

Productivity is also gained through combined search efforts of multiple searchers. Many individual end-users assess items stored in information systems, and there is much to be gained by tapping into their evaluations of items stored in these search systems. Aware Search provides limited search collaboration through sharing search data through the exporting and importing of data files. Through this method only one user is able to access the same exact search at a time and perform interactions. (Two people utilizing similar data files have different searches once they make changes to the files.) For bi-directional search collaboration, first a collaborating user must import the search data to gain the same results. Aware Search does not control what interactions the new user can then perform on that data, neglecting possible hierarchies in the collaborating relationship. Then, another file is sent back to the initial user, who must now establish version control and organize these search data files. Furthermore, Aware Search does not facilitate near real-time sharing of data nor is the system "socially aware".

Current cataloging, listing, and other similar systems have attempted to include social context by introducing systems that allows end-users to rate items, add commentary to items (e.g., "opinions"), "tag" (categorize) items found in a search, among others. An example is Amazon.com, based in Seattle, Wash., which offers a site with these common approaches to provide social context. The problem with such common methods of social context is social relationships are "inferred" based on the common relationship to a particular item in the search rather than the social contexts in which the end-user truly finds herself situated. In other words, every end-user who views an item becomes part of the "aggregate" or "group", and commonality of end-users is assumed based on similar query or interest in an item. The interactions, such as tagging and rating, are assumed "valuable" because of the assumed commonalty. These systems do not take into account commonalities the end-user values or the degree of trust the end-user has or established with other particular users. For query systems that cater to many end-users, a group of three hundred commenting on an item can become overwhelming for a particular end-user and not particularly useful. For example, a system that allows users to rate the "value" of a comment or item does not necessarily cater to the whole population of users in a given community. A comment that is rated high by one user may have been low to another. Basing "value" using the whole population of any community requires that the "norm" or "mean" of the "aggregate" wins out in the battle of competing voices. A large minority voice may be shut out, or a small, but vocal minority voice may be overvalued in these systems. Current systems do not necessarily capture the needs of some individual end-users who do not fall in the "norm". An example of this is the system for evaluating comments for "lens" employed by SQUIDOO LLC of Irvington, N.Y. "Lens" used by SQUIDOO are not related to search but rather is "content" driven. A "lens" is "one person's look at something online". Group collaboration is accomplished by people selecting a lens related to a topic they are interested in and providing content regarding said topic. "Links Plexo" provides a plurality of users the ability to add links related to a lens, and a "lens" allow users to comment on topics. A group lens additionally provides people the ability to swarm around content people are providing to the group; however, they do not provide a search system that integrates the established "lens". In other words, although a search system might search content within "lens" or titles of said "lens", the search is not based on interactions of results associated with user or group identities tied to a "lens". SQUIDOO's "lens" and "group lens" are not "search driven". There is a need to have systems and methods that can be both search and content driven so amass content can be more effectively shared.

Unlike SQUIDOO lens, "wiki" as used in Wikipedia by Wikimedia Foundation, Inc. of St. Petersburg, Fla., is too centralized. People compete to add content on a particular topic. Data provided is assumed to be "unbiased", and the electronic encyclopedia is meant to serve as an authoritative voice using multiple voices. The problem with this approach is many voices are left out or edited out. Wiki "wars" can happen as people try to establish their content over another. There needs to be a balance where multiple people can provide content; however, the content is not overwhelming to the end-user.

"Social awareness" in reference to search is defined herein as direct influence of a plurality of users to affect results displayed in a search. Social search can be either "explicit" or "implicit". "Explicit" search is where social relationships are "explicitly" shared to guide search. In "explicit" social search, end-users may know and have an established relationship with other end-users.

An example of explicit search methods is XFN utilized by Technorati.com of San Francisco, Calif. Relationships are used to share information to particular users. XFN uses keywords in HTML to represent relationships of a node to map true human relationships from those nodal relationships. People can be "friends", "acquaintances", or other types of relationships so the character of each relationship is known. This decentralized approach aides any engine to find these relationships. This approach is not practical for closed or private forums where search holds sensitive information. Also, this model places priority on the content providers' nodal relationships rather than the searcher's social relationships. The searcher for any given query might place more or less value on known or unknown relationships. For example, in one forum where the end-user is an expert, she may only want items related to those within her network. However, in areas she is not sure the expertise of her network, she might prefer exploring items from users unknown to her.

"Implicit" search is when social relationships are implied because end-users share something in common; however, end-users do not necessarily personally know other end-users in which data are shared. Implicit engines use implied relationships as a filter. These systems use the content of items search to imply the links and relationships of social networks. Those networks are then used as a filter to provide presumably better results on what an end-user might possibly want. Current systems use implicit social search to provide "collective intelligence". "Collective intelligence" in reference to search is defined herein as application and/or summation of data gathered from a plurality of end-users. Current collective intelligence models focus on the content of the items and not the actions and true preferences of the end-users. By using algorithms placed on the content rather than the user, these systems are only valuable when such relationships can be inferred by content and cannot be used in unrelated queries made by similar social classes. For example, an end-user who values parental opinion might query a movie unrelated to any keyword in the content associated with a parental role. The filter may be of value; however, this approach cannot use social filters for every query and cannot be applied to all content.

"Implicit" social search is more common, and includes most search systems that utilize aggregated information from other users to help guide the search of a particular end-user. Public tagging and social bookmarking systems (such as utilized by Yahoo.com of Sunnyvale, Calif., under del.icio.us, and Digg.com of San Francisco, Calif., among others) primarily rely on implicit social search and are currently popular ways to include collective intelligence within search. The social bookmarking site, Digg.com, primarily utilizes implicit, as well as "egalitarian" search to summarize news feeds. Egalitarian search systems treat all end-users with equal status and weight in relation to other end-users in the system. Digg.com's social bookmarking displays items according to the number of "digg"s it received. All users are able to "digg" an item or "bury" an item, and have equal opportunity to influence results. However, "collective intelligence" is dependent on the relationship of the "collective" to the end-user and how apparent biases that occur from the "collective" are to the end-user. Some systems use algorithms to try to infer the importance or value of an item to a particular end-user prior to the end-user making any valuations or actions. Biases within these "intelligent" systems are not apparent to the end-user. Digg.com allows user to include "buried" stories (those identified by other users as items to "bury"); however, it is not obvious to the end-user the biases of why an item was buried.

Systems that view each member as equal or establish a universal rank among all members do not capture effectively the relationships each member of the group has in relation to said group or community. For example, this type of egalitarian search system cannot be applied within an elementary school community consisting of young students, teachers, and administrators where members have different responsibilities, discernment, interest, etc. Administrators and teachers may want to possess some level of control over the search conducted of the group's student members to prevent "unsuitable" or "inappropriate" material from entering the classroom environment.

Items at Digg.com can be sorted by end-user's criteria. Information about who "digg"s an item can be shared to create a hybrid implicit/explicit model, and end-user can share items found in search with friends more easily. Social bookmarking sites still use the whole community's actions as a means of displaying results to the end-user. While nodal relationships can be made and maintained, self-identified groups are not able to share, collaborate, or inform extensively as a group within the search environment itself. "Cliques" cannot be formed within such communities. Although "cliques" tend to imply a negative type of relationship, they are quite useful in regards to collective intelligence. A "clique" has established and/or common experience and interpretations that may allow the end-user to processes information better as well as faster. An example would be a group of medical doctors within a specialty versus patients with a particular medical condition. Although both groups might be interested in similar topics, some information is less valuable to one group perhaps due to ability to comprehend complex medical terms and concepts. Conversely, there might be some information that is usually only spread within the medical community that patients might find useful.

Furthermore, even among limited "communities" that have shared commonality, such as those that have similar political interests, hobbies, or backgrounds, the greater commonality of the aggregate as a whole is given priority and results provided do not cater to the particular end-user. In other words, shared data applies to all equally as a whole and results given to a particular end-user do not account for the priority of relationships of said end-user at any given time. Or, worded differently, these systems produce same results to a query based on the aggregate data of the whole and do not take into account varying social contexts end-users may find more useful at any given time. Current search systems are meant to be informative but they are not necessarily material to the overall end-user experience. For example, an end-user may receive items based on an overall population of users with a shared political interest on a topic and similar party affiliation. However, particular items of interest may differ further by age of end-user. The older generation may value an item lower than the younger generation who values the item very highly. Currently, such distinctions are not made nor presented.

Currently, the end-user has limited control over the social context in which searches are conducted prior to the initiation of each query or in the process of a query session in the case of persistent queries. Social context (implied or explicit) is assumed prior to each query. Any user interaction currently affects search systems as a whole and do not affect only the end-user or sub-set of end-users who share a similar goal.

Most search systems cannot accommodate group-based search where the queries are generated for the purpose of providing information for group use. A group consists of two or more end-users who want to collaborate, share, and/or inform during the search process and who want to combine search effort, such as those in the same or similar fields of research, membership affiliation, enterprise endeavor, or more. For example, an organization may have two or more purchasing agents buying supplies from vendors. Another example is a professor and graduate students collaborating on a common paper for publication. Current systems and methods for group-informing searches have been limited in scope.

"Explicit" social search is not the same as "group-based" search. While many explicit social searches may help inform the end-user's personal search, explicit search does not necessarily facilitate the common goals of a group of known end-users. In other words, explicit social search is broader in scope than group-based search. While nodal relationships can be made and maintained in current explicit "social" search models, self-identified groups are not able to share, collaborate, or inform extensively as a group within the search environment itself. In other words, the priority in explicit systems is placed on the end-user, but does not allow extensive group-based awareness outside of the nodal relationships of the community as a whole. "Cliques" cannot be formed within search environments, which might be useful for groups aimed toward a common purpose, goal, or mission.

Collaboration in the group-based search model has most widely involved referring and/or sending other users items from a search via instant messaging or electronic mail, shared files from search clients, streaming results, and web-access portals that require end-users to be present at a specific time when the search is conducted. A collaboration search model is employed for RSS feeds by Newsgator of Denver, Colo., with their "Enterprise 2.0 Collaboration". The method employs a hub system of disseminating information in which RSS feeds are fed to specific people who then sort through the items and pass along relevant items to other collaborating members. The efficiency of this system depends on the productivity of a few people. This method does not allow for many people to swarm around information during a search to maximize use of time and utilize more people's expertise to aid evaluation of items, especially in a working group environment.

Newsgator's system is an example of a "hierarchical" search system, in which some users have a different status to other end-users in the system, for example, which could be related to importance, relevance, credentials, familiarity, etc. In Newsgator's system, status is created through the centrality of one end-user as "information gatekeeper". A hierarchy is forcefully placed due to the inherency of hierarchy in the search system, so that working groups whose collaborating efforts are meant to be "egalitarian" (same status) in nature are forced to identify an "information gateway person" within Newsgator's system. Another example of a hierarchical system would be Technorati's system on accessing html. Each end-user has access to only what the end-user has designated as "open" to the class of users, (i.e., family, friend, acquaintance, public). However, Technorati's hierarchical system only applies to the content provider's imposed hierarchical system and not the searchers'. This model neglects the status of the searcher within the group for which the search is intended. In the school example, content providers can rate appropriateness of material, and filters can block material rated inappropriate or permit access to material rated appropriate; however, these filters blanket the entire system. Teachers who might want to incorporate additional filters to aid her students on a particular project cannot isolate particular items for said search independent of the system as a whole. In other words, filters are not able to be tiered seamlessly within a search system based on the various hierarchical levels represented in the school. Filters, and more importantly, interactions on search results, cannot be tied to individuals within hierarchical groups with each end-user given a level of permissions to how they can interact with results from a query to influence the group as a whole.

While some current technological approaches try to recognize the end-user as part of "real" social networks, these systems tend to only focus on peer-to-peer relationships, content, or aggregated communities as a whole. Most current search systems are not group-based aware, including mimicking the structure of nodal relationships within those groups. In other words, these search systems do not take into account end-users wanting to be identified as members of a group, conducting searches for the purpose of the group, each having a certain status within that group.

"Artificial Intelligence" systems have also been employed in search systems as a means to reduce "noise". "Artificial intelligence" in reference to search is defined herein as computer implemented systems and methods applied to make predictions, inferences, evaluations, and/or guides to what an end-user may deem as valuable based on data gathered on end-user or plurality of end-users. In other words, AI systems work without requiring the end-user to provide a query. Intelligence applied to search systems become "smarter" through, for example, analyzing keywords in typical queries made by the end-user, the actions the end-user makes through a client, and/or the content of items chosen by end-user. Aggregated data from a plurality of end-users can also be applied to better predict what results a particular end-user might prefer or not prefer. The more an end-user or plurality of end-users interact with the system and patterns can be captured or ascertained, the more those patterns can be replicated and applied and even specialized for particular end-users. Blinkx of San Francisco, Calif., utilizes intelligence systems to infer the search intent of a user through the context of what is displayed to the user rather than their evaluation of what is displayed. Blinkx technologies use "implicit" queries, in other words artificial intelligence, to derive what other results a user might want. Blinx "contextual search" can be applied to many types of media, especially video. Another technology for "PICO" search engine provides the ability for users to view these implicit or explicit search results in "Smart Folders". "Smart Folders" is similar to RSS in that it receives results users subscribe to and is populated with results provided to a stream, "channels". "Smart Folders" and "Channels" are methods of delivering results rather than a complete search system in themselves. Intelligence, individual users, and content providers supply results for these channels for the smart folder. One display can have several folders that contain results for different media, such as blogs, RSS, and video. However, multiple channels cannot be integrated by the end-user with additional query criteria. Channels permanently contain results provided to the channel, unless removed. The channel itself cannot facilitate multiple different types of queries within the channel to provide results outside the channel. In other words, channels are independent much like Aware Search client folders or Newsgator RSS streams for collaboration, except they are smarter and have multimedia capabilities. Blinkx's channel system is not seamlessly integrated to allow end-users to explicitly drive search intent further. In other words, end-users are not able to choose how actual results should be related outside of "explicit query" or even "implicit" query". Items in "smart folders" are not necessarily what end-users asked for or want, but are generally related. Further, they do not incorporate explicit collective intelligence, which allows end-users to share data through a more effective search collaboration method. Rather, end-users are only able to share a result with another end-user through common means mentioned above.

Current search systems over rely on intelligence to drive search. Overuse of artificial intelligence takes away the freedom of end-users to conduct search for their own unique purposes. While the good intention of intelligence is to streamline search for the end-user by narrowing results that might better match intention, these systems fail to allow end-users to input more evaluations on search intent outside of "queries" and artificial interpretations of search intent. Not to say intelligence algorithms are not useful, but the best method for understanding what an end-user (or group) wants is the brain of the actual end-user. By utilizing intelligence in systems applying "awareness" to actual results through explicit interactions of end-users based on particular results, not only are the interactions of an end-user applied to results for current queries, but the search system is also able to provide results to the end-user based on patterns of previous interactions by the end-user and/or a plurality of users.

There is a need and demand for more contextual intelligence. Many technologies, such as GPS, RFID, and bar code readers in cell phones, incorporated with search help provide users with content around the current context they find themselves. These query systems, however, have not been fully integrated with search to allow users to interact with results more fully. For example, a navigation system for an automobile might provide feedback based on location of the car, and users are able to interact fully in areas based on navigation. Some content is able to be provided based on query, such as the query "restaurants" will load information regarding restaurants located near the user. However, the end-user is not able to receive evaluations on particular restaurants based on other users without visiting a website possibly devoted to such. Even if such information could be retrieved, a small display would not be able to handle possibly thousands of comments. Ratings have generally been incorporated as simple ways to provide aggregated opinion. A search system that is actually aware of the user, knowing whose opinion he will value, would be more useful, especially since most people do not have the time to go through lots of information for simple decisions, such as "where to eat". The data on results are currently not integrated in a way that can provide useful data based on social intelligence as well. Although these technologies are novel, such as barcode readers on phones, their uses are limited to quick, simple content, as more complex queries would take a long time to sort through information.

Current methods to bring "context" to search is through applying "local" search, such as Yahoo Local, from Yahoo.com of Sunnyvale, Calif. Yahoo Local uses many contextual features, such as maps overlaid with results, to provide users more information of what they might find useful. Although Yahoo Local integrates many queries into one interface, i.e. map query, web page query, user's comments, these mashups to not provide integrated collective intelligence and contextual intelligence. The maps and comments for a query do not provide and are not integrated so as to reflect the opinions of only a sub-set of people whom the end-user prefers an opinion. Yahoo Local provides context, but the context is not socially aware or contextually aware of the end-user. A search for restaurant on Yahoo Local will provide a list of restaurants with corresponding information regarding restaurant, a map with numbers corresponding to restaurants results, and comments provided by users of the site on restaurants. The end-user is not able to narrow the scope further through a prompt so results reflect his preferences outside of the general query. For example, he might prefer the company of sports enthusiast, but is looking for a restaurant that might not necessarily be a "sports bar". He might want a local pizza establishment with a "sports feel" or where sport enthusiasts go, but is not familiar with the area. Currently, these types of preferences to refine search cannot be captured through queries. Even if the user queried for "sports feel", only restaurants that are directly characterized as such would fit matching keywords. Currently, there is no method to capture such context that can be used directly by the end-user so as to better present results he might prefer. While "local context" can be captured, narrower, integrated context (e.g. implicit cliques) are currently not being captured outside of "location" through queries and awareness in query results themselves.

Accordingly, there is a need for improved and more efficient search methods that facilitate intent-driven search that go beyond query sessions to provide users the ability structure connections among queries in regard to weight, significance, relevance, and/or other criteria to aid searches aimed at specific goals, projects, and/or relevance. Furthermore, there is a need to provide sessions in aware search systems to capture interactions on results to multiple, interrelated queries and to optimize data stores without destroying the integrity of the data searched. There is further need for improved and more efficient search methods that facilitate social awareness in search results to provide temporary or permanent associations of multiple end-users based on goals, relationship ties, or other nodal affiliations to structure results. There is a need to provide more flexibility in explicit search to model "real world" hierarchies when they are pertinent to the nature of the search. Similarly, there is a need for a system that allows a plurality of end-users to interact with results concurrently to achieve the best desired results for a group of end-users. There is a need for implicit search to provide end-users more control over inclusion or exclusion of social context and other context as applied to search. There is also a need to apply more contextual intelligence through linking other context to query results other than keywords. Accordingly, there is also a need for user and/or group directed search that provides greater interactivity with results on how results should be applied to queries.

SUMMARY OF INVENTION

The present invention provides social and contextual search systems and apparatuses utilizing at least one computing device that seamlessly integrates awareness in search results through layered approach. Specifically, user, social and contextual awareness is accomplished in search systems through the data provisioning among user layer, session layer, and group layer. According to aspects of the present invention, end-users interact with the presentation (display) of results, and those interactions can be layered by way of different search layers (i.e., user layer, session layer, group layer) to provide results with integrated interactions without changing the integrity of the original result.

The present invention provides a search layer to establish unique identity to at least one interaction associated with at least one particular identified result to at least one query associated with a search layer node in which said interaction is facilitated. In some embodiments of the present invention, a session, group, or user search layer may be applied solely and/or independently to a search system to provide its own utility; however, multiple search layers can be applied and integrated to work concurrently and/or coherently to provide end-users with a more flexible and powerful search system that provides greater utility. In addition to establishing unique identity for a given layer, a search layer also stores data related to said search layer, and, in some embodiments, perform search layer commands to facilitate operations associated with said search layer. The search layer provides data to the result operational layer (ROL), interactive result layer (IRL), and other embodied search layers (if any) through loopback feedbacks to provide the function of said search layer to an end-user.

In accordance with an embodiment of the present invention the search system provides a user layer that establishes unique identity to a particular end-user to link said end-user with identified interactions for identified results that can be applied in conjunction with other search layers.

In accordance with an embodiment of the present invention the search system provides a session layer (SSNL) that establishes unique identity to a particular session to link said session with identified interactions for identified results. In a preferred embodiment, the session layer also performs commands associated with session layer. SSNL stores data regarding session in a session store.

In accordance with an embodiment of the present invention the search system provides a group layer (GL) to facilitate group-based social awareness in search results. The group layer (GL) provides unique group identity to preferably two or more identified end-users to associate said group identity with identified interactions performed by said group members for identified results. Group layer (GL) in the present invention provides a pool or collection of end-users' interactions on particular result based on shared group identity. In a group-layer only embodiment, unique identity for each end-user is not required; however, a means to associate end-users to a group is provided. That is to say, GL provides unique identity to groups and provides a means to identify members of said groups through a layer access control list (LACL). The GL stores data relating to groups, and, in a preferred embodiment, the group layer further provides the means to perform group commands.

The group layer has two primary embodiments in the present invention: egalitarian and hierarchical. In an egalitarian embodiment, all end-users are able to perform any interaction enabled by the means of the present invention, and those interactions are associated with the particular group in which the search is conducted, so those interactions are reproduced for other members of said group. In other words, interactions of a member of the group is reflected for all members of the same group, such that those result interactions appear to other members of said group when group identity is associated with the search. A hierarchical group layer additionally utilizes a layer command control list (LCCL) and/or layer interaction control list (LICL) to mimic group hierarchies such that not all members are granted the same privilege to perform group layer commands and/or interact with results in association for the entire group. Through a hierarchical GL embodiment, only certain members' interactions influence results for all members in a particular group. The level of influence and the structure or structures of end-user relationships are dependent on the particular rules for LACL.

In accordance with the present invention, there is provided a an interactive result layer (IRL) that comprises a display device with at least one prompt with graphical representations of available interactions to be performed on results facilitated by the ROL corresponding to embodied search layer. The IRL can further include the means to provide prompts to facilitate search layer commands. In some embodiments, the IRL can provide prompts to enable cross associations of search layers. For example, an end-user, while conducting a private (user aware only) search can choose to save a result for a group in which he is a member. IRL prompts, in some embodiments, can further include audio prompts, three-dimension optical prompts, and display overlay prompts. In addition to conventional means of inputting data, the present invention further provides audio, optical input. The IRL also provides the means to display ROL results. The IRL, in some embodiments, can also simultaneously display results from multiple layers or the same layer. The IRL provides the means to associate data from prompts to provide said data to the ROL and embodied search layer.

In accordance with the present invention, there is provided a a result operational layer (ROL) that performs operations necessary to facilitate end-user interactions on results that are associated with a particular embodied layer. The ROL can store data in at least one database. Interactions the ROL can facilitate are any interactions that affect the presentation or display of at least one ROL result; however, in an embodiment, the ROL may operate on actual items. In a further embodiment, result can be organized in a way which is interpretable to the ROL. ROL results and any attributes thereof can also be filtered. Supplemental data can also be furnished by the ROL to the IRL in some embodiments. In accordance with an aspect of the present invention, there is further provided system for providing an automatic result feeder that controls the flow of results that are provided to the ROL. The automatic result feeder provides the plurality of responses to a query to the ROL in real-time automatically when end-user interactions lead to omission of a result or results in the display or the display has a deficient number of results.

In accordance with the present invention, there is also provided loopback feedback in at least one computing device that includes data being provided to ROL, IRL, and embodied search layer. Loopback feedback method facilitates data provisioning among layers. In some embodiments, real-time loopback feedback can be provided to facilitate a real-time experience with the display of ROL results.

In accordance with an aspect of the present invention, there is further provided layer access control list (LACL). In general, the LACL provides a method of establishing layer access by particular user or group to data and functions a particular, embodied search layer provides. The LACL provides rules regarding who has access to data in search layer store. The LACL, in some embodiments, can further provide the means to restrict access or verify access to embodied search layer commands, called layer command control list (LCCL). In some embodiments, the LACL can also further include layer interaction control list (LICL), which provides a method to establish rules regarding privileges of a particular end-user with regard to said end-user interacting with results in association with embodied search layer. The LACL can be applied to multiple, integrated search layers or singly to one search layer regardless of number of search layers embodied. There is further provided a means to facilitate layer query control list (LQCL) which provides rules on permissions for queries submitted in association with a particular search layer node. There is further provided means for the IRL to omit or include prompts based on the LACL.

In accordance with aspects of the present invention, there is further provided means to provide simultaneous display of ROL results for multiple search layer nodes for the same query or for different queries. There is further provided means to synchronize displays of multiple users to enable search conducted at the same time.

In accordance with an aspect of the present invention, there is provided result associative interactive layer data (RAILD) binding, which facilitates the compositing of interactions to create an interactive operation command list (IOCL). This is particularly useful for a group layer only embodiment. The present invention further provides the means to bind RAILD for multiple search layer nodes, thereby having interactions associated with one search layer node to be applied to at least one other search layer node. For example, for the SSNL, one session can be bound to another session so the interactions for a particular result will be applied to another session or both depending on the embodiment of the present invention. Further means of RAILD binding includes providing summary data on interactions that can be displayed with ROL result. Further methods of search layer binding include, by example: hybrid, where a new search layer node is created representing bound search layer nodes; hierarchical (parental) structure, where one search layer node contains another search layer node, or binding two independent search layer nodes, or binding to a ghost search layer node, which is usually temporary to allow for the binding of RAILD, especially in embodiments applying intelligence algorithms. Search layer nodes not from the search layer are also able to be bound through a prompt in the IRL in some embodiments (e.g., group node with user node). End-users, in some embodiments, can be prompted to provide data to aide in the compositing for interactions associated with ROL results.

In accordance with an aspect of the present invention, there is further provided the means to store query criteria in association with search layer node. Query criteria can also include, in some embodiments, biological input, frequency input (such as, RFID, lasers, and satellite signals), geospatial location, and electronic markers in audio and video files. The end-user can also be prompted in some embodiments, to include or exclude these other query criteria. There is further provided means of funneling results through result interaction association with query criteria in which interactions on results are made through search layer node binding.

In accordance with an aspect of the present invention, there is further provided a search layer lens that provides the means to utilize particular qualifications (attributes found in search layer bins or profiles) associated with search layer nodes in association with interactions for results for said search layer nodes for particular query criteria to provide search layer contexts with results. In an embodiment, intelligence can be applied to generate attributes that can be used as qualifications.

In accordance with an aspect of the present invention, there is further provided search layer bins associated with a particular search node. A search layer bin has unique identity and can be accessed through search layer commands in a preferred embodiment. Search layer bins can contain ROL results associated with said bin, search layer node, and query criteria in which said ROL result was "saved" in said bin. In some embodiments, search layer bins may contain Internet media type content, such as multimedia files, text, html, etc., and provide editing capabilities associated with said content type. In some embodiments, there is also provided the means to organize said content. There is further provided the means to provide sub-bins, which are annotations to anchors in the content of a search layer bin. Annotations can contain Internet media type content or ROL results. One embodied Internet media type is a map. There is further provided the means to notify users of modifications to a bin or even provide content to a client. There is further provided a means to provide contextual advertisements within a bin. A search layer node may have multiple bins in an embodiment of the present invention. Another embodiment is a "smart bin", which is a composite bin of other search layer bins. Content for said bins can be abridged as for use in display.

In accordance with the present invention, the search system is embodied in a computing device or computing devices networked together, such as an Internet, Intranet system, or peer-to-peer. A computing device is a device with its own computing processor or is connected to another computing device having its own processor and providing computing capabilities for said connected device, such as, for example, slim clients connected to a remote server. By way of example only and is by no means all inclusive or exhaustive, computing devices include: servers, desktop computers, laptop computers, personal digital assistants (PDAs), mobile devices, or slim clients connected to a remote server. The system has at least one computing device providing methods herein, has storage for data, and provides a search engine (i.e., client only embodiment not requiring a network to receive results to a query. The system can also contain two computing devices, both of which are clients networked together for peer-to-peer search. Another embodiment is a client/server. At least one of the computing devices can provide a device to input and interpret frequency or biological input.

In accordance with the present invention, apparatus is a search server device providing contextual awareness, social awareness, end-user awareness, or combined awareness thereof in query results. The apparatus is server embedded with ROL, which is useful for the interaction intensive processes required. In some embodiments, the server can be a peripheral device. The apparatus of the present invention is a client computing device with embedded ROL that has a network device, a display, a device for end-users to input data, and, in some embodiments, device for frequency or biological input. This could be, by example only, a thin device that is able to interface with its environment and display results to user's queries. Since these methods can provide specific results, the systems are compatible with small interfaces that are contextually aware. The apparatus can also provide other devices contextual input.

Further benefits of the present invention will be made apparent in the detailed description of the present invention. Other aspects and features of the present invention will become apparent to those of ordinary skill in the art upon review of the following description of specific embodiments of the invention in conjunction with the accompanying figures.

BRIEF DESCRIPTION OF THE DRAWINGS

These illustrative examples of embodiments, figures and other objects, features, and advantages of the present invention will become apparent upon further consideration of the following detailed description of the invention when read in conjunction with the drawing figures in which:

FIG. 7 is a table depicting exemplary embodiment of session layer method of the present invention;

FIG. 8 is a table depicting exemplary embodiment of funneling method of the present invention;

FIG. 9 is a table depicting exemplary embodiment of search layer lens of the present invention;

DETAILED DESCRIPTION

The present invention provides methods, systems, and apparatus for seamless integration of user, contextual, and social awareness in search through layer approach. As more content is provided for use by others, a better search system is required that integrates content with search in a way that can provide more streamlined results to users based on the intent for the results. What we claim as new is collective and contextual intelligence applied to query results themselves. Our scope is based on the interactions (i.e. prompts provided by the IRL to facilitate interaction with results) with the presentation of said results that can provide a layer of context to end-users, so collective and contextual intelligence or better search intent methods can be applied to search itself and not just content building and sharing, although these are incorporated to provide enhanced contextual search. From our claims, we exclude the "user layer" only embodiment because end-users are able to interact with results. However, current approaches are limited in how they can integrate interactions with search beyond the end-user context, including contextual data provided by devices providing additional "real world context", such as geospatial location. We claim as new, the search layer lens applied to a user layer only embodiment. The present invention does differ from the parent application in how methods are arranged to provide the flexibility required to offer social and contextual awareness. The scope of the present invention is broader to apply more types of contextual interactions to facilitate social intelligence, such as ones commonly used (e.g., tagging and rating), which were excluded in the parent application. This flexibility provides the present invention the ability to be used for many types of searches, including, but not limited to: Really Simple Syndication (RSS), blogs, web search, desktop search client, application files, multimedia, etc. Also, search can be conducted utilizing many sources, including, but not limited to: servers with search engines, databases, file directories, etc.

Figure 1:
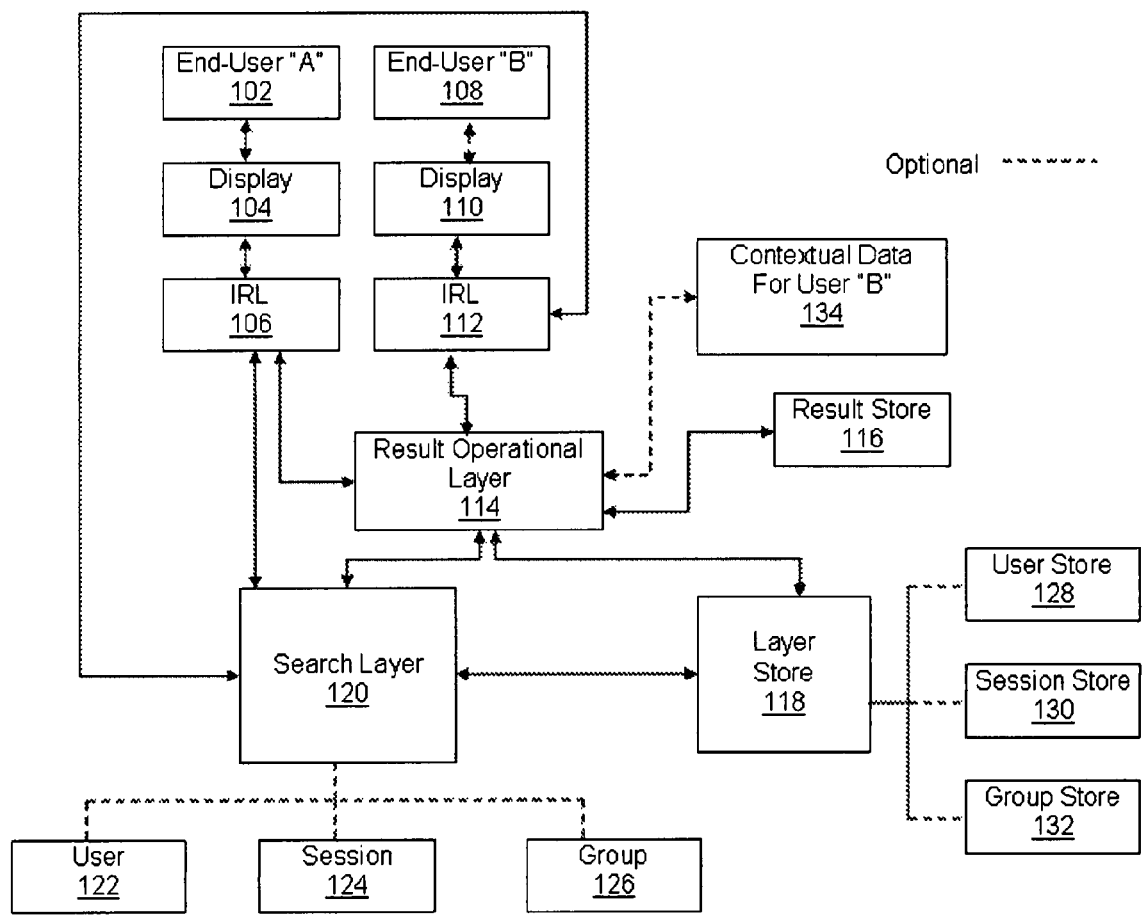
FIG. 1 is a flow diagram of an exemplary embodiment of layered approach in present invention.

The present invention provides computer-implemented methods of providing search layers (such as, user layer, group layer, session layer) to establish unique identity to at least one interaction associated with at least one particular identified result to at least one query associated with a search layer node in which said interaction is facilitated. FIG. 1 is an exemplary embodiment of the present invention providing a layered approach to provide awareness in query results for multiple users. Multiple users provide the present invention collective intelligence. However, the present invention can facilitate multiple users and only provide user layer and session layer, but still achieve collective intelligence as well as further provide contextual intelligence, and end-user awareness. For simplicity and illustrative purposes only, depicted are two unique end-users, "end-user A" (102) and "end-user B" (108). "End-user A" (102) interfaces with the present invention through a prompt provided by the interactive result layer, herein called "IRL" (106) and is presented results in a display (104). Likewise, "end-user B" (108) interfaces through a prompt from the IRL (112) and receives results in a display (110). The scope of the present invention is the display (104 and 110) of results and end-user input provided to achieve contextual, social, and user awareness in said results. The present invention requires prompts provided by the IRL (106 and 112) and, for end-user's, the means to interact (input) with results. The common means of providing prompts for end-user input is through displaying the prompt on a screen, and the conventional means for end-user input are associated with common input devices, such as keypad, keyboard, mouse, etc. However, prompt technology and input technology have provided more ways for computers and end-users to interact. In some embodiments of the present invention, the IRL can further provide prompts taking advantage of these technologies, such as an audio prompt, display overlay prompt, and three dimensional prompt. An "audio prompt" is means to provide end-users with an audio queue requesting an interactive operation. The audio prompt is usually a human voice simulation, however, it need not be. For example only, the human voice simulation is followed by a "tone", which lets the end-user know that data can be submitted. Moreover, the present invention further provides display overlay prompts. A "display overlay prompt" is a prompt used in conjunction with devices that provide end-user the ability to touch said device as input in connection with visual representation in the display (e.g., touch screen). "Three-dimensional optical prompts" are visual prompts that allow end-users to interact with a three-dimensional representation using optical displays.

The present invention further provides the means to provide end-user audio input. The means for audio input, by example only, usually provides means to convert human speech to data understood by a computer, or speech-to-text means. Optical input is further included, which can be, for example, use of devices detecting motions of end-users through optical frequency and interprets said motions. Display overlay provides both a way to prompt and input data associated with a display. Means of prompting and input are not necessarily associated; however, they can be in certain embodiments. For example, an audio queue may use a human simulated voice to request an end-user for an interactive operation, and the end-user might provide his response through touching a display overlay prompt or typing a response on a keyboard. The above examples are not all inclusive or exhaustive for the present invention. They are means to further provide end-users flexibility in ways in which they interact with a search.

The displays (104 and 110) are not necessarily similar depending on the embodiment of the present invention. For example, each end-user might be logged onto different groups providing different search sessions. In a preferred embodiment, the display would have prompts based on the particular end-user through the use of a layer access control list (LACL) (described further herein). In alternate embodiments, the displays can be synchronized to facilitate real-time collaborative search for two or more end-users. Through synchronized displays, multiple users can swarm around results to a query at the same time for methods herein. In a further embodiment, the IRL can provide results to multiple users, allowing one end-user to see results for multiple queries, or with synchronization of displays, it is possible for two or more users to see results for each other's queries. Discussed later herein is how multiple queries can be used in conjunction with search layer lens.

The display can be for a single search layer (i.e., prompt, or results for one layer represented) or incorporate multiple search layers (i.e., prompt, or results for multiple layers represented). An example for prompt for multiple search layers is: an end-user, while conducting a private (user aware only) search can save a result for a group in which he is associated. An example for multiple result display for multiple layers is: an end-user may enter a query and have results from the user layer (i.e., his interactions) be displayed next to results from the social lens layer providing results from other sessions (associated with multiple user interactions) fitting the context qualifications said end-user provided. An example of multiple displays for the same layer is: the IRL simultaneously displays results for two search layer lens, for example only, side-by-side. These methods are discussed further herein.

In some embodiments, the display can contain prompts for commands associated with a search layer. For example only, a session layer embodiment of the present invention could include a prompt to enable creation, deletion, access, modification, enumeration, and/or use of a particular session. Another example is for a group layer embodiment of the present invention in which a prompt could include graphical representations enabling access to an end-user to utilize the group layer for a particular group in which the end-user has or desires membership. In some embodiments of the present invention, the IRL can display multiple prompts for multiple layers. For example, a group layer may utilize session layers end-users may choose not only a group in which to conduct a search, but a session as well in one display. Another example of search layer commands are for search layer bins, such as to "open" or "close" said bin. Other commands can be "drag-and-drop" objects into a bin, or "saving" results to a bin.

Data provisioning between IRLs (106 and 112) and ROL (114) is accomplished by loopback feedback. FIG. 1 only depicts one ROL (114); however, each end-user in an implement of the system may be each provided the ROL. All methods depicted in FIG. 1 can reside together or separate in a system of the present invention. Moreover, each part (i.e., ROL, IRL, store, search layer) can reside in whole or in part. FIG. 1 depicts a server in which the end-users are connected. The present invention is accomplished through "loopback feedback" among embodied layers. "Loopback feedback" used herein is data provisioning among the layers of the present invention. Loopback feedback can be "non-real-time", which is the understood embodiment, or, it can further be "real-time", or "near real-time". "Non-real-time" loopback feedback is when data are provided to a receiving layer, and said receiving layer's response is only an acknowledgement. For example, commonly used "delete" commands for web implements use "non-real-time" loopback feedback, which is why the page needs to be refreshed to reflect said deletion. "Real-time" loopback feedback is when sending layer provides data to a receiving layer, and receiving layer provides data back to sending layer if receiving layer has data to provide to sending layer. For example, a real-time "delete" command would remove the result from the display without going though an intermediary method, such as "refresh" or "submit". Description of the illustrations usually refers to "real-time" loopback feedback. "Real-time" loopback feedback is preferable since the end-user will have a better experience with the display, as well as increasing productivity on a global scale, especially when end-user is evaluating many results. Loopback feedbacks occur with the IRLs (106 and 112) and the embodied layer and/or layers (120).

The result operational layer, herein called "ROL", (114) performs operations to carry out interactions end-user (102 or 108) input for particular results in the display (104 or 110). The ROL (114) is able to access result store (116). "Store" used herein does not necessarily refer to a single place of storage on a computing device, but is applied to encompass the source or sources of where data resides. It is possible for a "store" to reside on many computing devices. Also, layer stores can overlay each other (i.e., unified "store"), or they may be multiple, distinct stores. When search layers are integrated, it is preferable to have "a single store" representing all integrated layers. In a complex system embodying more than one layer and where not all end-users might be using the same search layers, some end-users are associated with an integrated store (e.g., user-session), while other end-users are associated with a single store because they are only associated with one layer (e.g., user store). Again, "store" is only in reference to data for use for a particular layer or layers. In a system of the present invention, how data is stored is not important, although some means might be more efficient. The importance is access for the methods described herein.

The "result store" is a name to refer to result data required for the presentation of representations of results. The result store does not necessarily refer to the actual items being searched, although in some embodiments, the ROL might have access to the actual item in which result data are obtained (e.g. desktop search). The present invention further provides the ability to affect items associated with its representation so as not requiring another browser to perform a redundant operation, such as permanently deleting a file from storage. However, for most embodiments of the present invention, results to a query are graphical representations of results, herein called, "ROL result". Through a "layer" approach and interacting on representations of results, results can be provided around a particular search layer or plurality of search layers that seamlessly integrate end-users' interactions on query results without changing the integrity of the original result set for other end-users. ROL result data are data required to establish unique identity of a result to be used in associations with interactions. Since interactions are directly associated with the identity of a result, said identity must be unique as to ensure those interactions for the result can be replicated, especially for other end-users to a system or for subsequent queries. There is required means to establish unique identity of a result to ensure that interactions can be captured and replicated for all interactive operations associated for search layer in the system. In other words, "unique identity" for group layer only embodiment in which groups do not share data might not require that a result have unique identity throughout the whole system. It is only required to be as unique as necessary to facilitate methods herein. In other words, a single, "unique identifier" is not necessarily required so long as unique identity can be interpreted. For example only, identity can be established through a combination of attributes of a particular result, or by an attribute that is inherently unique. If a result does not have unique identity, the ROL (114) is able to provide said unique identity, and, in some embodiments, save ROL data to result store (116). ROL result data is stored in a ways such that said data can be used in current, subsequent, and persistent queries.

The ROL (114) is also able to access layer stores (118) that are associated with search layers (120). The user layer (122) requires a user store (128); session layer (124) requires a session store (130); and, the group layer (126) requires a group store (132). Search layer store (118) contains all data relating to a particular search layer. Many search layer stores can be applied, but again, "store" is a term to encompass all of the data regardless of where it resides. For example, a search layer and result store can both reside together and apart when two clients share desktop search capabilities. Each device has its own result store. The search layer store, however, can be split among the two clients. In other embodiments, two clients can be connected to one server providing both result store and search layer store. In general, layer store primarily contain data on associations of interactions, said associations comprising: search layer node, ROL result, an interactive operation identifier, and any attributes of an interactive operation, herein referred to as "result associative interactive layer data" or "RAILD" for short. RAILD are the data that are provided through loopback feedback for interactive operations. "Interactive operation identifier" is a representation or means to associate an interactive operation for methods herein.

A "search layer node" is defined herein as the entity within a layer that is provided unique identity for methods described herein. "Entity" is a generic term used to describe a particular destination in which a search layer is associated. For example, in a group layer, the "entity" is a particular "group"; for user layer, the "entity" is a particular "end-user", for session layer, the "entity" is a particular session. When an embodiment of the present invention has multiple layers, a search layer node has unique identity for all search layers. That is to say, a search layer node is distinguishable from all other search layer nodes for search layers embodied in the system. For example, a search layer node may have the same group unique identity as another search layer node; however, said search layer nodes will have different unique identity associated with session layer (or user layer). The above example would represent two different sessions under the same group. Just as with result unique identity, unique identity does not necessarily have to be a "unique identifier" so long as unique identity can be interpreted. For example only, identity can be established through a combination of identities of a particular search layer node, or by an attribute that is inherently unique. Unique identity for search layer node is used for associations in RAILD.

Finally, along with search layer node and ROL result, RAILD further comprises the association of (end-user) interaction. End-users (102 and 108) "interact" with ROL results. The IRL (112) encapsulates said interactions through RAILD. RAILD may be associated with multiple interactions for particular ROL result for a particular search layer. Also, multiple results can be associated with a single interaction for a particular search layer node. RAILD can be the accumulation of results with interactions for a search layer node, and not necessarily the "end-user" inputting said interactions. For example, the search layer node might be a public session in which the end-user entered node, or the search layer node could represent a group in which the end-user is a member without unique identity. An "interaction" is defined as input of the end-user applied to at least one result ROL result which provides context to an end-user's evaluation of said result, including: means to add; insert; delete; remove; copy; comment; modify; edit; append; annotate; position; move; rank; order; rate; grade; mark; tag; scale; delimit, drag-and-drop; tier; bind; separate; connect; terminate; relate to; evaluate; vote; confine; restrict; calculate; calibrate; estimate; quantify; and stamp. ROL results, themselves, are only a representation of the results in which they refer. The above list of interactions is not all inclusive or exhaustive; however, it does demonstrate the wide range of context that can be captured regarding a result. Interactions are encapsulated by the IRL (106 or 112) performed by the ROL (114) and are referred to herein as "interactive operations", which include these interactions among others that affect how results are displayed. Although clicking on an item to view a result is end-user input in association with said item, said input provides very limited context, and is generally not recommended to be included as an interactive operation identifier for which associations are made, although it can be obviously applied. "Clicks" provide little information regarding evaluations and are generally abused when such interactions are used in intelligence algorithms. Also, not all interactions that can be performed by a system have to be included by methods herein. For example, the initiation of editing content for a result may not need to be captured. Interactions in which it is beneficial to capture said interaction for methods herein are provided an "interactive operation identifier". The IRL (106 or 112) associates interactions by the "interactive operation identifier." The ROL (114) identifies and interprets interactive operation identifier so the actual operation is able not only to be performed, but to reflect said interaction in the future. RAILD may further be associated with multiple layers in which interactions to results are facilitated. RAILD can also be associated with other attributes associated with any interaction or result or layer. For example, a "rate" operation has the attributes of the actual rating, for example, five highlighted stars. A layer attribute might be the session "title", "date created", and "brief description". An example of a result attribute might also be "title" or "url link". In some embodiments, RAILD can also be associated with query criteria in which said result interaction occurred.

In some embodiments of the present invention, query criteria can include contextual data that is included through a prompt (134), and are generally captured by a device associated with the end-user. Examples include, RFID, geospatial location, bar codes, electronic markers in audio/visual files, image files, and data from other sensors. While using such contextual data is not new to search, we do claim as new is providing such contextual data to search using methods herein. The present invention employs methods to provide more context to query results to provide "contextual intelligence", especially when applied by methods of the search layer lens (described herein).

The present invention can embody at least one of the following search layers: user layer only (122) with search layer lens method, session layer only (124), group layer only (126). Each layer provides its own utility in the awareness it can capture to produce contextual and collective intelligence. The present invention, however, provides more utility when search layers are combined. For example, group layer combined with session layer produces an intent-driven, group aware search; whereas, the session layer only ties awareness along intent or category; and, a group layer only provides group awareness without narrowing down intent outside of group intent. Employing methods disclosed herein, search layers facilitate awareness in results provided to a particular end-user that is pertinent to a particular embodiment. That is to say, an embodiment may require only a few layers to obtain varying "awareness" and capabilities required by said end-user to conduct a search.

Figure 2:
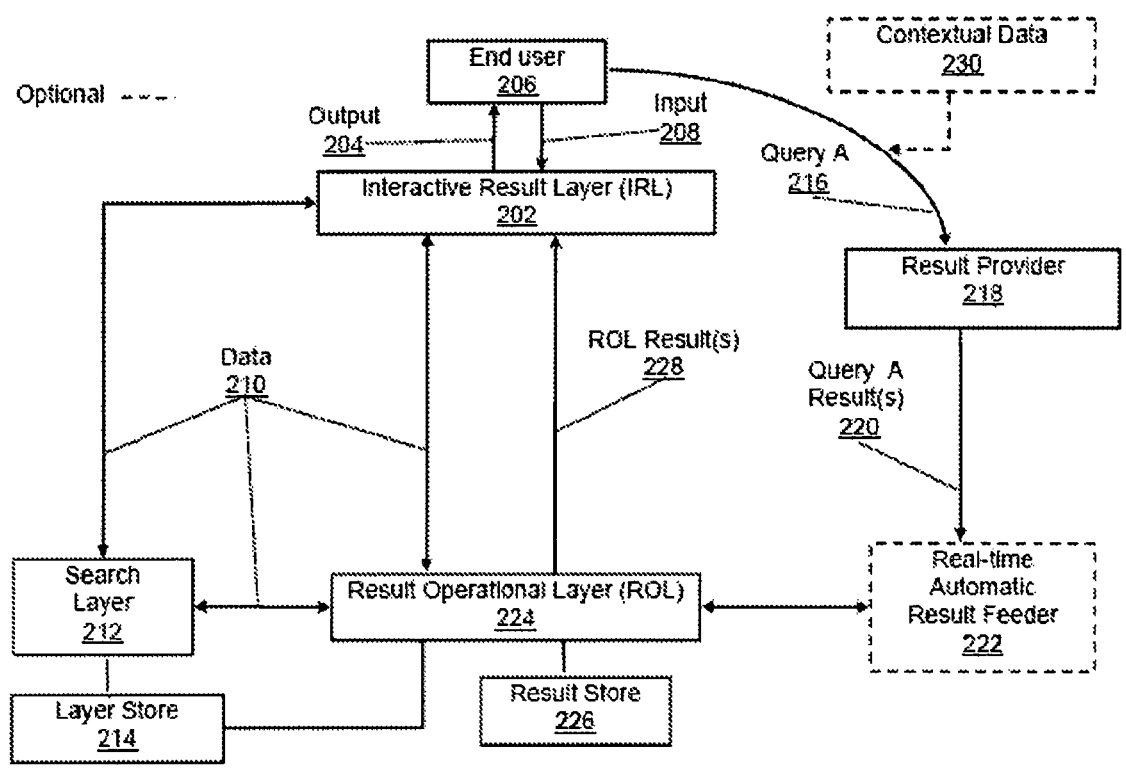
FIG. 2 is a flow diagram of an exemplary embodiment of a search layer of the present invention.

FIG. 2 is a flow diagram of an exemplary embodiment for a generic embodied search layer of the present invention. FIG. 2 can be applied to session layer, group layer, user layer only with search layer lens method, and any combination thereof. In general, FIG. 2 illustrates the provisioning of data through loopback feedback among embodied search layer (212), the IRL (202), and the ROL (224). Said embodied search layer (212) provides the IRL (202) and ROL (224) with data necessary to associate interactive operations with search layer node for particular results (RAILD). Again, a "search layer node" has unique identity for corresponding search layer in the present invention. Each end-user to the present invention is not necessarily a "search layer node" as he might not have unique identity within the system. An "end-user" (206) is the person utilizing the system. In some embodiments, the IRL (202) further provides said embodied search layer (212) with data necessary to carry out commands associated with said search layer and the prompts necessary for end-user (206) to select said commands and provide data necessary to facilitate functions of particular said search layer. Said search layer (212) and ROL (224) have access to (search) layer store (214) corresponding to said search layer. A "layer" is a representation of methods to describe functions for ease of understanding. Seamless integration is possible because the base methods of identifying and associations are similar in approach, which enable data to be linked in new ways to provide more contextual search.

Further details and embodiments of the present invention become more apparent when FIG. 2 is detailed in an exemplary embodiment of a particular search layer For ease of understanding the present invention, the figures provided herein primarily refer to session layer. Figures for the copending application can be further used to illustrate how the IRL and ROL function to provide identity and encapsulate interactions. Real-time end-user awareness can be accomplished with the present invention; however, the parent application accomplishes this in more specified means. Also, the only interactions encapsulated in the parent application are interactions that change the structure of results in the presentation to facilitate a real-time experience with displayed results. The present invention provides more flexibility so end-user identity is not a requirement. Also, contextual interactions are used in the means herein as the purpose of the present invention is to provide greater context to guide users' search. Therefore, "ratings" and "tags" would apply.

Recognizing that interactions are guided by the end-user's intention for the searched items within a global purpose and not necessarily with queries in themselves, the present invention establishes session identities and links them to interactions for particular results, and possibly other sessions and/or sub-sessions in some embodiments, to produce an intent-driven search. In general, "search intent" is the purpose in which an end-user is conducting a search rather than just what they are searching. While query identity can be applied to the present invention, it is not material or required for the base session layer (SSNL) to provide utility. That is to say, "unique" query identity is not necessary; however, it can be applied in an embodiment of the present invention. The end-user is provided means to process results in an intent-driven system that can structure results based on session with multiple, heterogeneous or similarly made queries to provide a more meaningful, effective, and efficient way to utilize results from a search.

In a preferred embodiment of the session layer (SSNL), the interactive result layer (IRL) (202) provides a prompt (204) to an end-user (206) to facilitate session-based search. The prompt would be associated with search layer commands for session layer, which can include, by example only, creating a new session or selecting a session or sub-session. The session layer (212) further provides the means to identify and carry out commands of a session, including, by example only and by no means are exhaustive or all inclusive: "create", "delete", "edit", "list", "add query", "set query index", and "bind" within a layer. Session commands are performed in session layer. "Search layer commands" are defined as commands that facilitate the functions of a layer, which can include common commands presently used to provide facilitate user-based, computer-implemented methods. A new command is search utilized by the present invention facilitates session binding initiated by the end-user, for example, using a search lens layer or for funneling. Other session layer commands are not visible to the end-user, but help facilitate other functions of methods herein. The present invention also provides the means to provide search layer commands to facilitating a search layer bin (described further). Session layer does not require commands. In some embodiments, sessions do not necessarily need to be created by the particular end-user through the IRL as they may already exist through other means, such as a list provided to a computer-implemented method to generate sessions or administrator creating session or session created by another end-user. For example, some sessions might be imposed on certain members, such as a teacher using a session for "dinosaurs". Through a further embodiment of LACL, she can control query so, for example, the query contains keywords relating to dinosaurs to ensure her students are on task or do not venture to forbidden sites.

In a further embodiment of the present invention, the session layer provides session commands. In this example, end-user (206) inputs data (208) to create a new session. IRL (202) can create session data by utilizing input parameters and making assignments to said data. The IRL (202) provides session command that is encapsulated in session data (210) necessary to create a new session to the session layer (SSNL) (212) through a loopback. Both IRL (202) and SSNL (212) have the means to identify said session commands, and the SSNL (212) is provided the means perform operations necessary to facilitate such commands for sessions. Session data would include all information needed to create session by said end-user. SSNL (212) feeds back established unique session identity (210) to the IRL (202). Session data are stored in a session store (214) by SSNL (212). Session store (214) contains data pertaining to identified sessions and any attributes thereof. In a preferred implement, the session store (214) resides in a database management system (DBMS), although it can be single data structure or a plurality (list, array, etc.) of data structures. The session layer (212) is able to maintain its own associated layer store (214) if required. Search layers are overlaid methods. Through loopback feedback, a search layer is able to provide the functions required of it. With multiple layers, the search layers become overlaid as the functions are overlaid.

Figure 3:
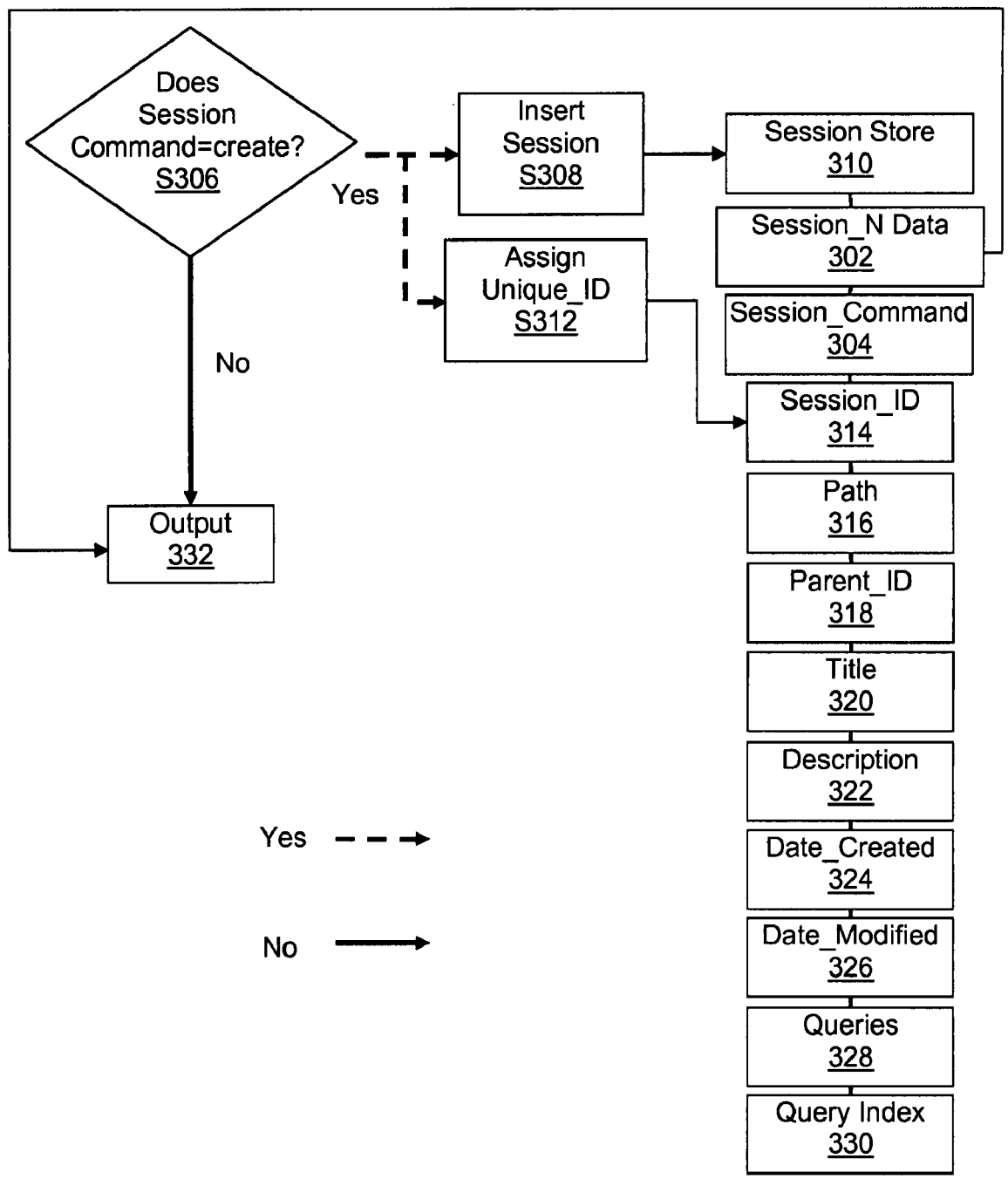
FIG. 3 illustrates exemplary logic and steps of means to create a new session and establish unique identity for a session layer of the present invention.

FIG. 3 illustrates exemplary logic and steps of establishing unique identity for a particular session in the SSNL of the present invention. FIG. 3 can also be applied in general as an exemplary means of facilitating a search layer command. The session command, to "create", is prompted to the end-user by way of IRL. The end-user selects "create" prompt, and IRL provides session command (304) to SSNL for non-uniquely identified "Session_N" (302). Step S306 is the exemplary evaluation, "Does Session Command=create?" In some embodiments of the present invention where search layer commands are not restricted by a layer command control list (LCCL), end-users are able to essentially turn a particular search layer node "off" or "on" through said commands. If S306 is true (session command does equal "create"), then step S308 provides the session store (310) with session data (302) from the IRL. Next step S312 is to assign a unique value to "Session_ID" (314) to represent "Session N", which is to be created and can be used to identify said particular session. S308 and S312 can be reversed or performed conjointly, depending on the means implement by the SSNL. Further, in this example, "Session_ID" is an exemplary field in the DBMS that contains the unique assigned identifier for session. The use of "ID" does not imply that all search layer nodes must have a single data attribute to provide unique identity as aforementioned. Any means that ensures uniqueness so a search layer, IRL, and ROL are able to distinguish a particular search layer node from a plurality of search layer nodes in said plurality for the purpose of associating said search layer node with data representing an interaction or a plurality of interactions performed by a particular end-user and a result is sufficient.

Session data for "Session_N" (302) represents data belonging to said particular session node (search layer node), "Session_N", that a particular end-user created by way of the IRL. Session data (302) in FIG. 3 is only an exemplary data structure for illustration and does not represent all ways in which session data can be represented. In this example, session data is the association of the new "Session_ID" (314) with its attributes. "Path" (316) attribute contains a string value which contains the directory structure so the IRL can display Session_N (302) in a directory tree. "Parent_ID" (318) is the unique identifier of parent session for this example. Another example could have contained a field for sub-sessions. Hierarchical session structures are provided by an embodiment of the present invention; however, does not need to be applied to all embodiments of SSNL. The value of (318) could be null or unassigned to indicate that a particular session is a "root" session having no parent in an exemplary embodiment. "Title" (320) is an attribute of the session providing a name to said session, which was assigned by the end-user when he initiated the "create" command. "Description" (322) is a brief description of the session optionally provided by said end-user through a prompt or is generated through means of intelligence algorithms. An additional attribute of session data could be a "profile" of said session and can be utilized by a method of search layer lens, described further below. "Date_created" (324) is an exemplary field that includes the date said end-user created said session (302). "Date_modified" (326) is another exemplary field that contains the date said end-user last modified the data associated with said session (302). "Queries" (328) represents a data structure (list) that can contain queries made in association with said session (302). "Query Index" (330) is the index of said list for queries (328). These exemplary attributes are assigned to a particular session through the IRL. The exemplary attributes were part of session data provided by the IRL. Since no interactions have been made by the end-user yet on ROL results for this new session, this particular RAILD does not have any interactions associated with it yet nor does it have any ROL results. The attributes illustrated here are for exemplary purposes only and is not all inclusive or exhaustive. The output (332) depends on the particular implement, but the data will for this particular session will come from "Session_N" Data (302), which now includes the session identifier (314). Exemplary "Output" (332) of session data is provided to the IRL during a feedback operation. If S306 were not true (No), then SSNL would continue until it found a matching command with the identified command.

Referring back to FIG. 2, SSNL (212) also provides session data (210) to any other interfacing layer when and if necessary, such as the ROL (224), so session identity can be established in the system. Alternatively, the ROL can be provided session identity through the IRL when end-user interacts with a ROL result. The end-user (206) provides the IRL with the first query, represented by "Query A" (216), which is provided to a result provider (218). A "result provider" is used herein to refer to a source of result data regarding results to an issued query required for the presentation of results. The result provider does not necessarily supply the actual object of the result even though it can be the case some time. The result provider might be a server or cluster of servers generating result data specifically for queries, i.e., search engine connected to database systems. The result provider might be a client sharing data regarding results, again without necessarily having access to actual object of the result. The result provider can also be on the same computing device providing methods herein.

Figure 4:
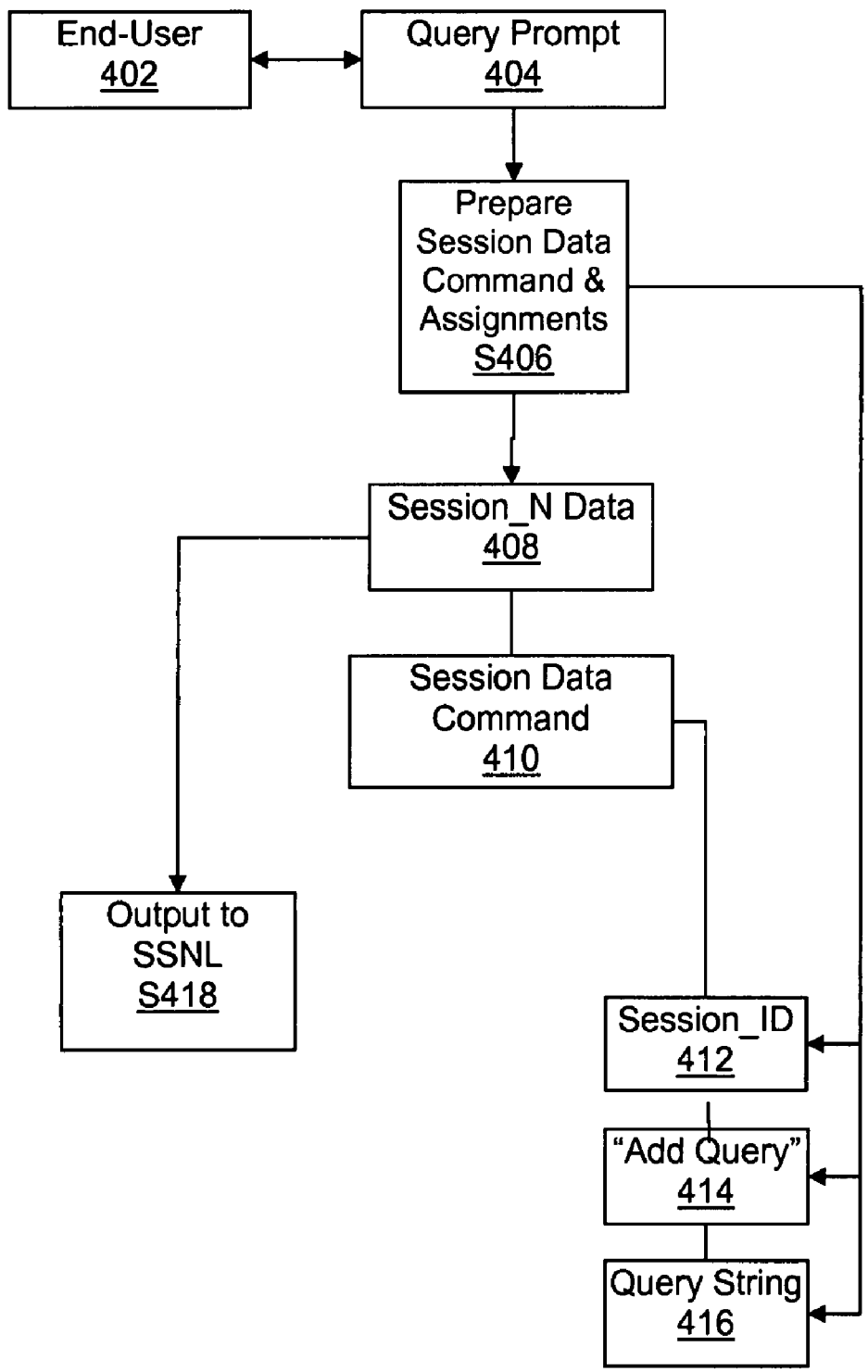
FIG. 4 illustrates exemplary logic and steps of means to provide SSNL a search layer command in IRL.

A loopback operation from IRL (202) to SSNL (214) is performed, and the query (216) is then added to the session store (214) in this exemplary embodiment of SSNL. Query data need not be added to the session store (214) in all embodiments of session layer; however, such data is necessary for a search layer lens. FIG. 4 illustrates exemplary logic and steps of loopback from IRL to SSNL, and more particularly a query being added to session data for an identified session that was previously established. FIG. 4 can be generally applied to attributes being associated to a search layer node through prompts in the IRL to further facilitate search layer commands or methods of a search layer. End-user (402) through query prompt (404) in the display of the IRL submits a query. In step S406, the IRL prepares session data command to encapsulate the "add query" (414) session command in (search layer) data for "Session_N" (408). This includes, by example only, assigning to the data structure for session data command (410) the session unique identifier (412) representing "Session_N" that was established in the IRL by the SSNL, identified session data command "Add Query" (414), and the particular query string (416) entered through the query prompt (404). "Add Query" is an identifier. Identifiers for search layer commands are used to associate data to an actual search layer command facilitated by an embodiment of the present invention. "Add Query" is an example of a search layer command that is not prompted directly through the IRL by the end-user; however, said session command facilitates a function of the SSNL for methods herein. "Add Query" allows a particular embodiment of the present invention to provide end-users session funneling and social layer lens. Queries can be used as well to provide log of previously made queries that can be re-executed. This exemplary session command is not required for all embodiments of the present invention; however, this example shows how a search layer command does not necessarily need to be prompted by the end-user. Session data for "Session_N" (408) is the provided to the SSNL as output of the IRL in step S418.

In this exemplary embodiment, the result provider (218) generates results for the query and does not provide methods described herein. The query results (220) pass through the real-time automatic result feeder (222) where results are organized as a plurality of responses to a query and particular identified session and a specified number of results are provided to the result operational layer (ROL) (224). The real-time automatic result feeder (222) is not required in all embodiments of the present invention; however, it is useful when providing real-time awareness to systems and methods herein. The real-time automatic result feeder provides results to the display when there is a deficient number, and it controls the flow of results. For this example only, the results (220) transparently pass through the ROL (224) in a newly created session. In other words, they pass through the ROL (224) in the same fashion and order the automatic result feeder (222) supplies results since no result is associated yet with an interaction yet. The output is herein called ROL results (228). "ROL results" are identified results, although not necessarily uniquely identified. The methods herein, only requires that results are provided unique identity for associations. However, this does not exclude implements where all results are provided unique identity. The data to identify results is contained in the result store (226). ROL results (228) are provided to the interactive result layer (IRL) (202), which outputs (204) the ROL results (228) to be displayed to an end-user (206) along with a prompt or prompts with at least one interactive operation the ROL (224) facilitates. Again, not all interactions provided by the system need to be implemented by the ROL. The end-user (206) may select said interactive operations to be performed on particular said ROL results (228) through the prompt, which is input (206). Interactive operations selected (208), any attributes thereof, and any assignments for said output ROL results (228) are encapsulated in RAILD (210) by way of the IRL (202) that further associates interactive operations with corresponding identified results for the identified session. In the present invention, RAILD (210) encapsulates data necessary to perform interactive operations, as well as any other data pertaining to a particular search layer that might be utilized by the present invention, such as "query", utilized for methods of providing search layer lens. RAILD (210) are used to ensure results are structured in accordance with past and current interactions for a particular result associated with a particular session.

Figure 5:
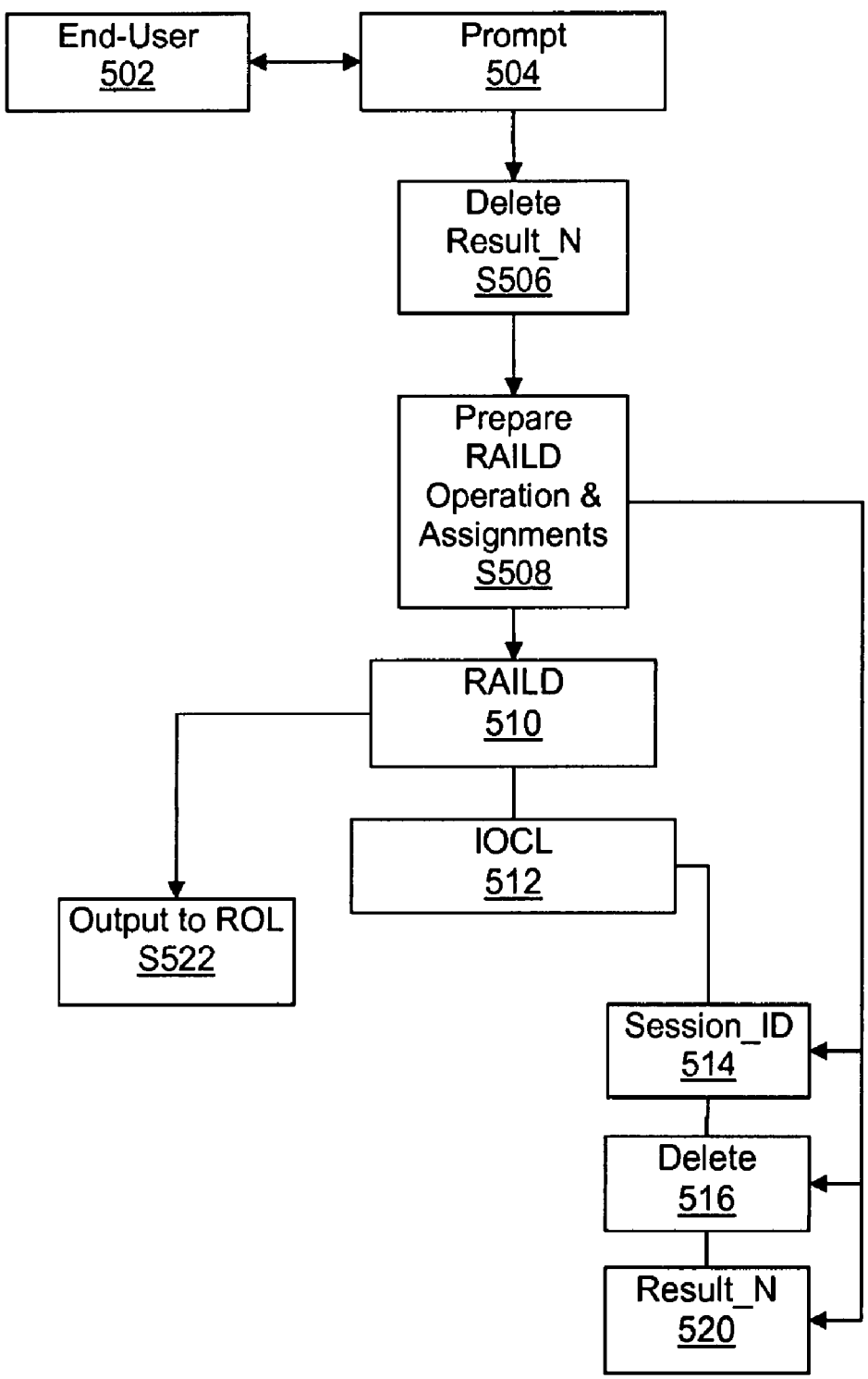
FIG. 5 illustrates exemplary logic and steps of providing RAILD in IRL for session to ROL.

FIG. 5 illustrates, by way of example only, the logic and steps of the interactive result layer (IRL) associating session unique identity to an exemplary interactive operation employed by an exemplary embodiment of the present invention. In general, FIG. 5 depicts the encapsulation of an interactive operation for an embodied search layer for a particular result to provide RAILD to the ROL. In this example, a particular end-user (502) elects from prompt (504) in the IRL to delete a particular result "Result_N" (S506). Step S508 prepares RAILD operation and assignment by encapsulating exemplary interaction "Delete" to RAILD (510) to the interactive operation commands list, (IOCL) (512). The interactive operation commands list (IOCL) facilitates the ROL to perform actual operation to enable particular interaction. The commands list (512) contains data assigned by step S508, including, identified session through "Session_ID" (514), identified interactive operation "Delete" through interactive operation identifier (516), and said "Result_N" identifier (520) in which the deletion is directed. FIG. 5 shows the deletion of "Result_N" for a particular session represented through IOCL and RAILD. Step S522 provides as output RAILD (510) to the ROL. FIG. 5, in general, shows how associations are performed in the IRL to integrate embodied search layer to be utilized by the ROL to perform interactive operations in association with particular result and particular search layer nodes. If the embodiment included another search layer, the unique identity associated with that layer, such as user identity, could be added to the IOCL for RAILD for output.

Figure 6:
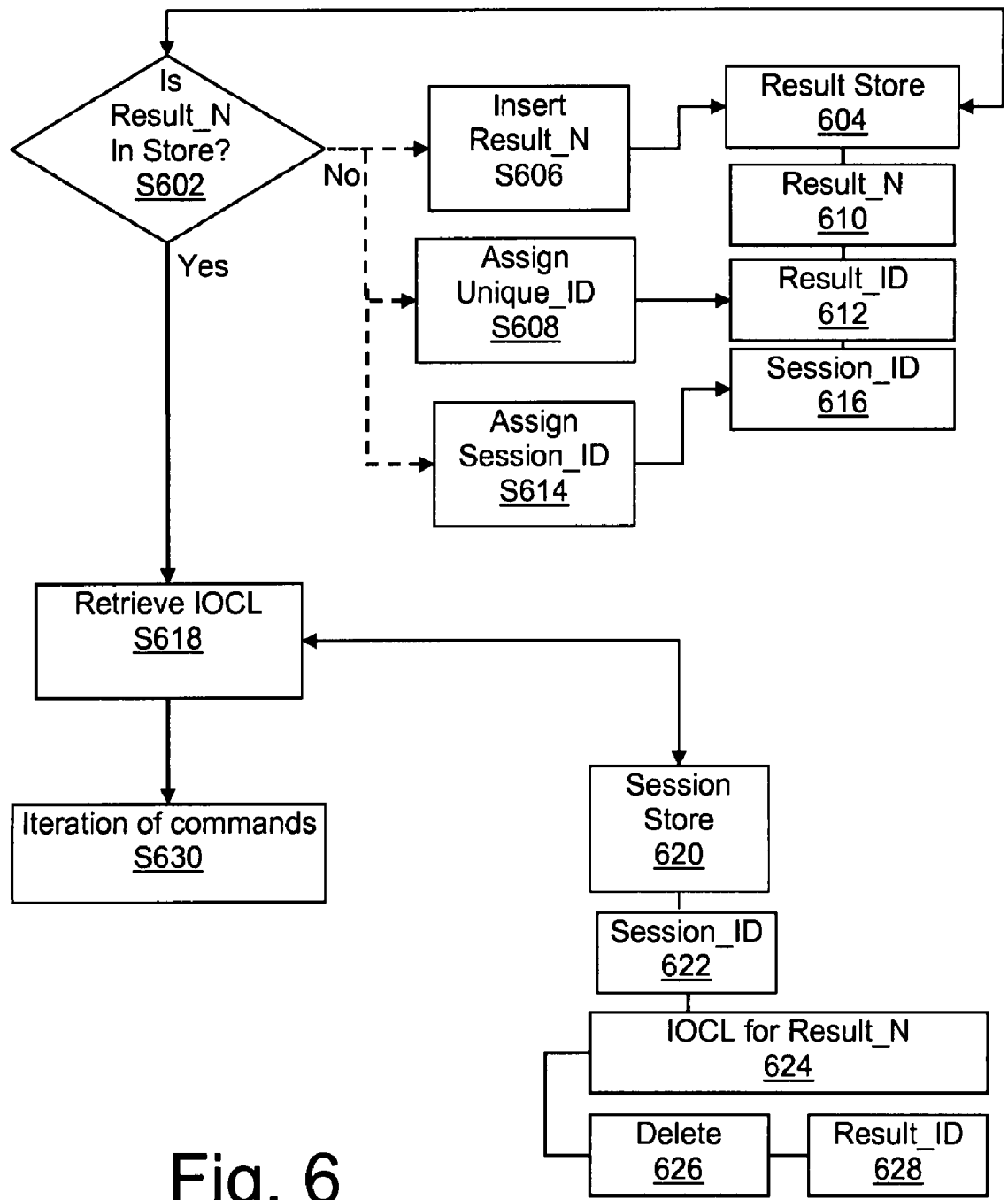
FIG. 6 illustrates exemplary logic and steps of means to provide identity for a result and IOCL in ROL for a session.

FIG. 6 illustrates an exemplary embodiment of the logic and steps of a result in iteration in the result operational layer (ROL) for a uniquely identified session. In general, FIG. 6 depicts, by example only, the steps of performing assignments and retrieving interactive commands in the result operational layer (ROL) associated with multiple search layers. In this exemplary embodiment, the ROL is on a client saving result data only for results that are associated with interactions. Result data only need to include as much data necessary to uniquely identify a particular result. Furthermore, in this example, not all results are linked to a particular session's unique identifier automatically, although other examples can include all results to queries within a session are automatically linked to the session. In this example, the end-user must first interact with the result, and then result and session identities are provided.

Intent-driven, end-user aware search depends on "uniqueness" of session and associated result to ensure each end-user interaction is properly associated with its corresponding result for said session in which the interaction is directed. The interactive operations that are performed by an embodiment of the present invention must be sufficiently associated with the result that is the target of said operation within its uniquely identified session or bound sessions. That is to say, the identity of the result is linked to the identified session and identified interactive operation to provide a RAILD. The entire pool of RAILD for a particular result comprises the interactive operation command list (IOCL). In this example, the IOCL for "Result_N" contains only one RAILD for the interactive operation "delete". The first evaluation step (S602), in this example only, for assignments in the ROL is to determine whether "Result_N" (610), a generic result in the result set, resides in the result store (604). In a preferred embodiment, the result store resides in a database management system (DBMS), although it can be single data structure or a plurality (list, array, etc.) of data structures. The result store (604) contains data pertaining to identified results and any attributes thereof. The first step S602 is the evaluation, "Is 'Result_N' in (result) store (for particular session)?" S602 can be broken down to two evaluations in other embodiments: "is 'Result_N' in (result) store"; and, "is 'Session_ID' equal to current 'Session_ID'?" If such a result exists in result store (604) and it contains and is associated with the same session identifier in which the evaluation is taking place, then said result (610), including its unique identifier, "Result_ID" (612), and unique "Session_ID" (616) will be sent to step S618. The "Result_ID" (612) of "Result_N" (610) is utilized in step S618. If "Result_N" (610) is not found in the result store (604), then said result is inserted in step S606 to reflect "Result_N" (610) in the result store (604), and said result is assigned a unique "Result_ID" (612) in step S608. Step S614 assigns the unique "Session_ID" (616) of the current session in which the evaluation is taking place. The ROL utilized the "Session_ID" in data that were provided from the IRL; however, in other embodiments, it may have obtained the "Session_ID" from the session store or other search layers (when interactions cross layers) interfacing with the ROL. S606, S608, S614 may be in different order or occur simultaneously depending on the means to identify operations in the ROL.

The ROL proceeds to step S618 in which the ROL retrieves the interactive operation command list (IOCL) for "Result_N" (610) in association with session identifier (622) from the session store (620). Session store (620) contains RAILD pertaining to a uniquely identified end-user and said end-user's interactions with uniquely identified results necessary to perform operations to reflect said interactions. The RAILD for this example contains: Session_ID" (622) established unique identity and IOCL (626) for "Result_N". The exemplary interactive operation identifier depicted is "Delete" (626), associated with the "Result_ID" (628) of said "Result_N" in which the interactive operation identifier "Delete" is directed. "Result_ID" 628 is equal to 612, both representing "Result_N" (610). The RAILD from the IRL on an interactive operation identifier is stored in the session store (620) through the ROL. For the deletion of "Result_N" (610), "Session_ID" 616 must equal "Session_ID" 622 in this example. The step of retrieving the IOCL (S618) only returns interactive operation identifiers associated with "Session_ID" (622) and result identifier (628). That is to say, the IOCL (624) will contain interactive operation identifiers that have coincident values for their respective associative attributes. Finally, step S630, is the iteration of interaction operation commands for "Result_N" the ROL carries out to reflect the interactions associated with "Result_N" (610) for the particular identified session (616 and 622). Another association for another search layer could be added, which would only add another evaluation to ensure, for example, "User_ID" of RAILD provided by IRL is equal to "User_ID" in session/user store for "Result_N". The search layer node would then represent a particular session for a particular user.

RAILD data are stored by way of the ROL in a session store, and, optionally, result data are stored by way of the ROL in a result store in a way such that said data can be utilized in current and/or subsequent queries. In an embodiment where the result provider is a search engine and the ROL is embodied in a client obtaining results from said search engine, it is beneficial to store result data on the client and preferably only in relation with a result that has an interaction associated with it.

With the session layer, interactions are associated with sessions rather than limited to queries, and in some cases, require no saved query at all. End-user (206) may enter another query in association with the same session. The subsequent is then added to the session store (214), of FIG. 2, via a loopback from the IRL (202) to the SSNL (212) to store said query string in association with the continued session. When the ROL (224) receives the results to the query (232), the ROL (224) then may, in this example, retrieve data from the session store (214) and result store (228) to identify interactions to particular results in association with particular identified session. Interactions associated with results that may have appeared in the first query are applied to those same identified results for the subsequent queries for the particular session in which they are associated. End-user (206) may interact with ROL Results (228) via IRL (202), proceed to enter another query, or discontinue the session through a prompt in the IRL (202).

FIG. 7 is a table depicting a simulation of exemplary queries for two distinct sessions in a session and user layer embodiment of the present invention. Column 702 contains the unique identifier for "User_ID" utilized in this example to identify the particular end-user "121" submitting queries. Column 704 contains variable "Session_ID", representing the unique session identifier for two exemplary search sessions said end-user "121" created through a prompt in the IRL. The first session has assigned unique two-digit numeric identifier "10". The second session has the value for "Session_ID" as "20". Column 706 contains the "Sub-Session_ID" for two sub-sessions ("101" and "102") for session "10". Session "20" contains no sub-sessions and therefore "sub-session ID" is null or not included. A sub-session identifier is assigned when the end-user creates a sub-session, but depends on the embodiment of providing search layer node binding. The particular method depicted here is a hierarchical structure. "Search layer node binding" allows for two or more search layer nodes to be bound together such that interactions from at least one said search layer node is applied to another said search layer node, or, in an alternate embodiment with other rules, applied to both. In exemplary embodiments of the present invention, a bound session can be created by the end-user through a prompt in the IRL to combine multiple sessions. Or, an alternative exemplary embodiment of the present invention, sessions might be automatically bound through intelligence algorithms. These examples are meant for illustrative purposes only and are by no means exhaustive or all inclusive to the present invention. In this example, the interactions in sub-sessions are applied throughout the same parent session through the association of the unique parent session identifier. However, not all embodiments of the present invention need include this method of parental (hierarchical) structure (i.e., parent/child sessions) of "search layer node binding". An alternate method can bind sessions without clearly defined structures. A further embodiment, the bound session has its own unique identifier to provide a "hybrid" session. Another embodiment provides a "ghost" search layer node which is a temporary search layer node utilized for the purpose of binding RAILD. Search layer node binding is not restricted to RAILDs associated with the same search layer in an embodiment of the present invention, but can be applied to RAILDs with no shared search layers. Interactions for one search layer node may be applied to another search layer node through at least one established rule on how RAILD is to be associated. Some embodiments of the present invention allow end-users to initiate session binding through prompts. As in this example, an end-user can create a sub-session or can actually choose two search layer nodes to bind. Unlike other common methods providing results in folders, sessions do not necessarily contain results already inside, although search layer bins can be created (discussed further herein). And, also unlike channels or folders, sessions can be integrated to influence one another. For example, interactions made in a user layer for a particular node may be applied to a particular node for the group layer.

Column 708 contains the numerical order of each exemplary query string contained in column 710. The first query string for session "10", sub-session "101", is "Martin Luther". The second query string, "Protestant Reformation", is also for session "10", but for a new sub-session, "102". These exemplary query strings do not share any similar keywords in the prompt. The third query string, "History Catholicism", and fourth query string, "Catholic Church Germany", are for the same second session "20". Again, query strings do not have to be saved for all embodiments of the SL. They are depicted in FIG. 7 for illustrative purposes only. The SSNL enables end-user interactions on results to queries be applied to identified sessions rather than query strings themselves. In other words, interactions on query results are not necessarily tied to the number of queries performed or the query string issued.

Column 712 contains the "Result_ID" for ROL results displayed to the end-user for simplicity of demonstration of concept to reader. Column 714 contains the numeric order of ROL results adjacent and contained in column 712. "Suppressed" in column 714 refers to result not having an ordinal rank because it is not displayed through the IRL due to its suppression by the ROL. Column 716 describes the interactions, if any, taken by the end-user. For simplicity, the only interaction depicted is "delete". "Not Applicable" contained in 716 refers to results not presented to the user and, therefore, cannot have subsequent interactions.

For the first query of the first session, "Martin Luther", the end-user deletes result "1235" (row 718) and "1236" (row 720). In the second query of the first session, "Protestant Reformation", result "1236" appears (row 724) even through it was deleted in the previous query. This is how most current systems operated with different keywords. They are not aware of other interactions on queries, especially if the queries are different. The two sub-sessions are independent based on the rules on how binding commands should be applied. Other embodiments may apply other rules on hierarchical search layer node binding. (The sessions are grouped based on a hierarchical structure. The user, in this example, also deletes result "1240" (row 726) for sub-session "102".

Session "20" contains two queries to demonstrate that a session is not dependent on individual queries made. A session or sub-session, depending on the particular embodiment of the present invention, may contain as many query strings as such implement allows. Through the present invention, end-user interactions are associated with sessions rather than queries, providing "awareness" in a more generally applied "intention". In other words, by disassociating "awareness" with a single query, interactions can be applied to multiple queries that share the same end-user intention, but do not necessarily share similar keywords or other query criteria. "Query criteria" herein refers to any data submitted in conjunction with a query or as part of a query. Usually, query criteria refer to keywords. However, query criteria can further comprise, for example, RFID, geocoded tags, bar codes, electronic markers in audio/visual files, image files, and data from sensors. These other forms of query criteria are discussed later herein.

For session "20", "History Catholicism" contains result "1240" (row 728), although it has been deleted in the previous query (row 726). Again, the interactions from the previous query do not apply to the next query, since they are not "bound". The user deletes result "1243" in row 730. The last query, "Catholic Church Germany", is also made under the second session. Result "1235" appears in row 732 even though the user deleted said result in row 718 during the first session. Also, result "1240" appears in row 736 even though the user deleted said result in row 726. Again, the interactions for session "10" are not applied to the second session, "20". However, in row 734, result "1243" is suppressed since it was deleted in the previous query in row 730. Although the queries are still independent (i.e., different result sets), the interactions are linked only through sessions, based on how the end-user binds (groups) queries. With RAILD binding, for example, sub-session "102" can be bound with session "20" to allow for the interactions of said sub-session to be performed in the ROL for session "20", excluding all other interactions from other sessions and sub-sessions, such as sub-session "101" in this example. If this were the case, result "1240" would be suppressed in rows 728 and 736, while result 1235 in row 732 would still appear.

Through the application of SSNL, ROL will yield results that are of meaning and intent of the search session and are not necessarily bound to the keywords and/or other search criteria of a query. Search results that are of meaning to a particular end-user within a session become a natural progression process without necessarily having to rely on search criteria in queries. This implement is most useful for "investigative" search in which the end-user is not familiar with items searched and may submit new queries based on information gathered. This search is also best applied to "project based" search in which specific queries might only be related to overall project. For example, a manufacturer might search for parts needed to produce a specific machine. Session-based search can be applied to other utilities not described herein. The ROL results, regardless of queries, eventually become exclusively meaningful to a particular end-user. In this example, while all four queries are related, none share exact keywords. The end-user has more control to choose how queries are related and linked.

SSNL can further provide social awareness in query results without a group or user layer though a plurality of end-users' identification with a common session. In other words, individual end-users are sharing data based on a particular session (category) rather than group identity. End-users share data with other entities based on shared commonality with a session (category) when SSNL stores query criteria and provides methods of funneling and/or summarization and/or search layer lens. All these methods may be applied separately, or when provided conjointly to SSNL, the SSNL can provide social context to better handle a large plurality of end-users who want to share data related to an identified category but the actual search is not intended for a common group purpose. The plurality of end-users is not "cohesive", or, in other words, they do not share a common, group purpose for search. The end-user shares a weaker tie to the plurality of end-users in which they share data. "Weak" here does not imply that the "identity" of the individual end-user is weak based on the category of membership, but rather the tie to the group is "weak". An example would be a Mustang car enthusiast. A particular end-user may have a strong personal identity as a "Mustang owner"; however, his relational tie to other Mustang owners in general as related to search is weak when the search itself is not intended for a common group purpose. Rather, the search might be for personal use; but the evaluations the end-user applies to search might be deemed valuable to other users who associate with said category. Mustang ownership might be very important to a plurality of end-users who want to share data related to search based on common, related identity. Funneling utilizes interactions based on query; but, rather than basing these combinations with everyone's interactions, they are segmented through associations with search layer nodes to be bound, providing for "cliques". SSNL further allows a plurality of end-users to share data associated with a session (categorical) identity, but not all interactions made by members are equally applied since many conflicting interactions may occur, such as one member might want to delete an item while another member might find it highly valuable. Means of compositing interactions are provided by the present invention. The session identity is utilized and prioritized in the results to reflect context of a particular session (category). The display of those results by way of the SSNL assumes the end-user has a specific purpose for the search outside of a group purpose. Synchronization of data is not as important as compilation and summarization of data. SSNL can further provide the means to summarize data on interactions for display, which is most useful when applied to large groups who do not necessarily know one another, but who want to share data on search that share some commonality. A summary is also a quick way for end-users to ascertain what they see.

SSNL layer does not require any form of end-user identity. In other words, the SSNL is not aware who is interacting with results. However, some embodiments of SSNL may utilize a layer access control list (LACL) (described below), which would require some form of user identity, although not necessarily unique identity. An example of session layer access control is a means to provide permissions, where each end-user contributing data that will be accessed by SSNL would explicitly or implicitly give permission to contribute his own interactions for inclusion. Another means is to provide subscriptions so each end-user of a particular session would subscribe to said session and have been granted access to said session. These examples are by no means exhaustive or all inclusive. The above means would be established by the rules of providing layer access control list. In an SSNL embodiment that does require identity, an end-user can create and/or select a session (for example, based on a categorical title) and conducts search within said session.

The session layer can further apply a method of funneling results, which is especially useful for a large plurality of unknown users accessing same session. "Funneling" refers to a specific method of associating interactions for two or more search nodes utilizing query criteria. In an embodiment, SSNL can further provide the method of result funneling. SSNL stores data relating to session identity and related associations to results and interactions based on captured query criteria. Any search conducted by any end-user within said session is associated with said session and is applied to all similar query criteria for any end-user conducting search within said session. End-users are only connected through relationship with said session through their interactions for results for particular queries within said session. For example, the end-user by selecting "Mustang" is allowing his interactions for the subsequent searches to be associated with the session "Mustang" and the query criteria in which the searches are conducted. The session layer can be applied as a type of aware search "filter" based on collective intelligence to be layered on results to provide search refinement. Users are able to "pivot" around categorical sessions when conducting searches.

Unlike other current methods, sessions are not just folders or streams of results provided by end-users. Rather, sessions are searches themselves where results are associated with interactions. The more people use a session and interact with results, the more streamlined the results become. Information on their search is shared to other users when they access the same session and supply a similar query. SSNL can further provide rules for compiling results to reflect a plurality of interactions for a particular result for particular query criteria. If multiple, conflicting interactions occur by users, the SSNL is provided the means to composite said interactions to ultimately determine how results should be displayed. For example, when many users of the same, identified session rank an item differently, the SSNL may composite the interactions by calculating the median rank or applying the last modified rank, depending on the rules established for interaction compositing for the specific implement. Based on the rules of compositing, the SSNL creates a composite interactive operation command list (IOCL) to provide to the ROL. In a preferred embodiment, composite IOCL are the composite interactions for a particular ROL, which we claim as new as applied herein. However, in another embodiment of the present invention, other rules on how to bind RAILD can be applied, which includes binding RAILD based on interaction, for example only: for common sorting based on interactions (such as ratings). These bindings through prompt are not new in themselves, but, when applied with methods herein, they become more useful since these interactions can be layered with other context facilitated by the present invention. Furthermore, depending on how the rule of RAILD is established, interactions and results can be bound based on attributes represented in RAILD, discussed later herein. SSNL can further provide the means to summarize data on interactions for a particular result. Said data are provided to the ROL that appends results with said summarized data to be provided to the IRL for display. The present invention further provides a method of providing intelligence to query results utilizing intelligence algorithms of based on interactions associated with search layers.

FIG. 8 is a table depicting exemplary result data for an embodiment of utilizing means to funnel data for session layer, which in general is most appropriate to accommodate a large number of users. Method to funneling, which comprises of summarizing and compositing for two search layer nodes and RAILD associated with same query. The two sessions represented in this example are "Mustang" and "Corvette" (column 802). Column 804 represents the query string "leak brake hose line", which is made in both sessions. Other query strings could be listed here associated with said sessions; however, they are not depicted for simplicity of illustration. Results provided for the aforementioned query string are listed in column 806. For simplicity of illustration, only five results are listed, represented in result sets for both groups: "R1", "R2", "R3", "R4", and "R5". "R" is a notation for "result" followed by the original ordinal rank of the result. "R1" is the first result; "R2" is the second result, and so on. Column 808 represents the average ratings end-users have given each result adjacent to and corresponding with column 806 for the query string "leak brake hose line". This example applies the values "1" to "5" with "1" representing "not useful" and "5" representing "most useful". Without user identity, SSNL is not aware of repeat users providing multiple ratings. However, other ordinary and commonly used methods could be employed to prevent such abuses that can provide user identity to SSNL without having to employ a "user layer" as typically applied to the present invention. This can include, by example only, means of detection and prevention of automated systems not disclosed herein, but are obvious means to deter abuse. Other embodiments of SSNL could employ a layer interaction control list (LICL) to establish rules on multiple, similar interactions made by the same user. LICL can also be used to filter content provided through interactions.

Column 810 contains the number of ratings provided to the system identified with the respective session in column 802. Usually, the number of ratings would be associated with number of users, assuming each user applied a single rating for said result. An SSNL only embodiment does not assume these users overlap when no user identity is provided to the system, but a preferred embodiment would include layer access control list LACL to identify end-user, although the end-user need not have "unique" identity. The number of ratings could be provided in the summary information in the display, and it could be applied to the compilation of results for display through a particular implement of SSNL that applies weights to interactions to composite interactions. Column 812 represents the display of the results to a particular end-user submitting the query string "leak brake hose line" through the session in column 802. For the session, "Mustang", the results are in the following order: "R5", "R4", "R1", "R2", and "R3". For simplicity, the order is based on the average rating not weighted by number of ratings. "R5" had the highest rating of 4.8 (row 816) followed by "R4", which had a rating of 4.7 (row 814). Contrarily, for the session "Corvette", the order of results is as follows: "R2", "R3", "R1", "R5", and "R4". "R2" had the highest rating of 4.9 (row 818) followed by "R3" with a rating of 4.4 (row 820). The order of the results in the display can change as new data are entered into the system that are associated with said session and said query string.

FIG. 8 demonstrates how SSNL is able to provide results based on end-user commonality to a categorical bias. Through a session layer, end-users are able to employ a common session identity to evaluate and interact with results and share that data with other users sharing that search bias. While the session commonality could be included to a query string, for example "leak brake hose line in Mustang", some systems that provide search to a wide range of items or a great scope, such as web search, the keyword "Mustang" can be placed in the object of search, such as index, without specifically addressing the end-user's intent for the query string. For a web search example, "Mustang" may appear in the html document or content of said document in reference to problems with "car transmission" rather than "brake hose". Other end-users are able to commonly evaluate the relevance of said result for the identified session. The above result example might receive a low evaluation by many users because the item does not specifically address the "Mustang" in reference to the "leak in the brake hose line". Contrarily, that result might have contained the string "leak brake hose line" in connection with a "Corvette", and end-users identified with a session for Corvette might find that result more useful.

Sessions, like "tags", can provide categories as related to search. But, rather than having individual end-users "tag" specific results and then having to search tags, the session layer in a layer approach creates a session in which multiple queries without direct relation to the session/category can be applied and more data on evaluations of results (through interactions) can be shared across a plurality of users or a single user based on that category. Unlike "tags", which are keywords searched, sessions are the categories in which the search pivots. Sessions can be further used in reference to any sort of categorization, including, but not limited to affiliations, hobbies, interests, product names or model, zip codes, web domains, and more. By employing or creating a session, the end-user is searching around that session/category, basing interactions (such as comments, ratings, and deletions) specifically on said category. So when another end-user selects that same session, data are shared only regarding that category. To illustrate, rather than receiving comments made by all users in a system for a particular item, the end-user would only receive comments on an item by other end-users who pivoted around the same session/category said end-user chose, such as "Mustang". With a "tag" system, end-users are only describing an item with keywords. A result tagged "Mustang" might refer to a horse rather than a car. Each session has unique identity, unlike a tag. With sessions in the present invention, each "mustang" session is provided a unique identity to narrow search intent, and with sub-sessions, "Mustang" car might have multiple sessions for further refinement. Also, the SSNL layer can use further interactions, such as "tags", to be used in a session profile utilized by other methods described herein. The benefit of SSNL is the end-user can always disassociate, in a particular embodiment, with a particular session and receive all data regarding interactions made for the particular result if they so desired. Unlike a folder or other current methods, multiple data sources may be searched, and, since multiple queries can be made in a session, items can be saved under a session search which can include multiple items from multiple sources, including multiple result providers. For example, an embodiment may have session search that includes RSS search, web search, and a desktop search, all associated with one session rather than multiple queries. Another benefit of a layered approach in the present invention is the optimization of data stores through session command "delete". In other words, when an end-user or group has completed use of a session and no longer deems the data valuable, said data associated with said session may be deleted from the session store without affecting other data.

The present invention further provides a method of providing additional context to query results through a search layer lens. A "search layer lens" is defined for the purpose of the present invention as the pool or collection of search layer node data based on relevant search layer context provided as qualifications through a prompt utilizing methods disclosed herein. For illustrative purposes only, a search layer lens might include a single context (such as, occupation, marital status, or geographical location) or multiple contexts (such as "mothers aged 35-40" or "professors of sociology/demography"). How end-users should be prompted for qualifications or what they can prompt (i.e., open-ended prompt or closed) depends on the implementation. A system with few users might require narrowly defined qualifications, while a system with many users can obviously facilitate more context.

Recognizing that context is more than keywords, maps, and interactions with results, other query criteria can be applied to further the richness of context that can be applied to methods herein. The search layer lens is also able to incorporate other criteria into the query, usually provided by other context in which the search takes place, to provide deeper "contextual intelligence". "Contextual intelligence" is intelligence provided through use of data capturing context that can be provided digitally without requiring text. Usually such data is provided through devices utilizing frequencies, for example, and is by no means all inclusive or exhaustive, microwave (satellite), radio (RFID), optical (lasers, barcodes) as input. In FIG. 1, contextual data is represented by 134, and in FIG. 2, contextual data is represented as 230. In an embodiment, contextual data can also not be applied through a prompt provided by the IRL. Other context can be provided in multimedia files (audio/visual) through electronic markers. Other context can include already mentioned geographical information (geocode) through a prompt (i.e., map). These contexts can help narrow the scope of a search and are currently applied. These contexts are not fully integrated to apply context within query results in themselves associated with end-user interactions. While, for example, users can search on a mobile device which can take into account their location, and the search might produce results related, for example, on a rating, current methods are not able to refine search enough to make these technologies practical for complex queries. The information provided in these searches have been very narrow because of computing capabilities on devices that use them, and, for popular use, the small displays that cannot contain lots of content. While these technologies provide lots of awareness that can be useful for search, the presentation of results is not practical so as to further narrow results based on even more end-user awareness, social awareness, and contextual awareness to provide quicker access to relevant information.

Through incorporation of contextual data outside of query, the search layer lens is further able to provide enhanced contextual intelligence. The search layers lens utilizes "attributes" generated for or created by search layer nodes. Attributes for a search layer node, commonly known as "profile", are commonly created by the end-user. For example, the end-user submitting a form (type of prompt) with data regarding himself. Attributes are found in RAILD in direct association with a search layer node. A session or group can also have a profile, or collection of attributes in direct association with said session or group. For example, the path of session in a hierarchy, title, data last modified, or a description of said session. In other words, attributes characterize a search layer node, Again, profile attributes for the search layer lens method is not similar to "tags", which associates a keywords to actual result items. Rather, the search layer lens provides attributes to the search layer node itself. To illustrate the difference, a "tag" system used for articles related to cars have users tagging articles related to keywords they believe the article fits under. Other users are then able to click on the related tag or search tags with a prompt for the topic they are interested in. A query for the tag "Mustang" only produces items other users believed relevant to tag. Any other interactions, such as ratings, that might be displayed along with the article are not necessarily related to the tag "Mustang", but summarize all interactions performed by other end-users. Contrarily, a search layer lens for session layer would retrieve all interactions for results associated with the same query criteria the end-user also submits with sessions providing the qualification for "Mustang". Since a session layer pivots around certain search intent, the profile associated with that search intent will be directly related as with all the interactions for results.

Examples, provided only for illustration, of prompts for qualifications provided by the IRL include, a list of pre-selected "qualifications" (i.e., close-end prompt), or an open-ended prompt for keywords that might be associated with end-users and/or groups. Other query criteria can also be used not provided through the prompt. This can include, by example only and is by no means all inclusive or exhaustive, geographical location through navigation system, electronic markers in audio/visual files, RFID, and bar code information. Search layer lens uses the pooled data to generate a compilation interactive operations command list (IOCL) for results related to said query and can further provide summary data regarding interaction operations. The rules on how to compile and summarize interactions for a result are determined by a particular implement of the present invention. The associated search layer or IRL provides the ROL with the compiled interactive operations command list (IOCL), and, if embodied further, the summary data for each result. Not all results provided to the ROL will necessarily be associated with IOCL provided by the search layer, meaning it is possible that not all results returned by a query will have an interaction associated with it for the provided qualifications for said query.

When the search layer node is a person or group (i.e., user layer or group layer), the search layer lens provides social context, i.e., social lens. Social context data refers to any data that characterizes a particular user (or group). Examples can be, although are not all inclusive or exhaustive, social categories (gender, race, age, etc.), status (marital, family, education, etc.), interests (sports team, hobbies, activism, political issues, etc.), affiliations, geographical location, profession, organizational membership, etc. In embodiments of user layer or group layer that provide LACL, permissions can be established to access said profile for users or groups. The search layer lens compiles and summarizes data from a plurality of end-users regarding particular results for particular query criteria. The method of search layer lens does not necessarily need to provide awareness of the actual end-user in the compilation for results. In other words, the particular end-user submitting a query under a search layer lens will not necessarily have associations linked to him be included in the results if he himself does not personally fall under the qualifications he chose. Search layer lens provides a means to share data regarding search layer context, but does not associate a particular end-user's interactions with results with said search layer lens. In other words, the particular end-user's interactions with results within a search lens do not affect other end-users also applying said search layer lens, unlike the funneling method. However, the particular end-user's interactions are associated with the search layer node he is associated with while employing search layer lens. For example, an end-user does not have to be an "electrical engineer" to apply the lens "electrical engineer"; however, his interactions will affect the search layer lens associating results that match attributes in the profile for the search layer node he is associated (e.g., user layer, group layer, session layer). Only interactions performed by users or groups whose profile fits "electrical engineers" are incorporated in the composite interactive operation command list and the summary of interactions for results returned for particular query criteria.

For social search layer lens, it is possible to have only one social search node that fits a qualification, such as "(My) Mom". This is not the same as seeing user's "wishlists", although that can be an attribute. Search layer lens are tied to query criteria. A "list" provided through shared data can be accessed by querying specifically for said item not tied to any other query criteria. A "qualification" is a specific query to the attributes related to search layer node to be associated with query criteria in which such associations are made. For example, the end-user queries, "cameras" and then uses as a qualification "Mom", the interactions for results made by "Mom" are applied to his search. He might be able to see her direct rating of items. If she deleted items, they will not appear. She can rank items to the top of her list. A "wishlist" can also be utilized through a search layer bin as content provided in said bin. Search layer bin is discussed further herein.

Profile attributes for the search layer lens method is not similar to "tags", which associates a keywords to actual result items. Rather, the search layer lens provides attributes to the search layer node itself. To illustrate the difference, a "tag" system used for articles related to cars have users tagging articles related to keywords they believe the article fits under. Other users are then able to click on the related tag or search tags with a prompt for the topic they are interested in. A query for the tag "Mustang" only produces items other users believed relevant to tag. Any other interactions, such as ratings, that might be displayed along with the article are not necessarily related to the tag "Mustang", but summarize all interactions performed by other end-users. Contrarily, a search layer lens for session layer would retrieve all interactions for results associated with the same query criteria the end-user also submits with sessions providing the qualification for "Mustang". Since a session layer pivots around certain search intent, the profile associated with that search intent will be directly related as with all the interactions for results.

Since some data on users can be very personal and sensitive, a preferred embodiment utilizes a means of permissions to make such data public to other users. Data for sensitive characteristics (such as, but not limited to, race, religion or political affiliations) should generally not be associated with data to identify particular end-users unless the end-user provides explicit permission. Common methods to grant permission to access data, includes, but is not limited to: whitelists, blacklists, subscriptions, peer-to-peer permissions, and general "public"/"private" permissions. Ethically, the best practice should not allow "omission" to be equated as "permission" to make such data public. In other words, for sensitive data, permission to share data should not be assumed. Again, search layers can provide a means of layer access control list (LACL) to establish access control to functions of search layer lens.

FIG. 9 is a table depicting simulated exemplary embodiment for search layer lens in present invention. The embodiment depicted here utilizes data associated with session layer, including data in a field provided by session profile and data regarding rating interactions for particular results to a similar query. Column 902 contains the unique "session_ID" of ten exemplary sessions that are associated with similar query. Column 904 contains a profile field for model of automobile in which end-user is submitting a search layer lens. For simplicity, only three categories of automobile ownership are represented here: "Mustang", "Corvette", and "Stealth". The session profile may contain multiple fields with varying lengths and types of data strings. In a preferred implementation, the end-user could select multiple qualifications from said fields. Column 906 depicts which session (in corresponding column 902) meets the qualification "Mustang" the end-user entered in the prompt in the IRL for the search layer lens. Five sessions have associated with the qualification "Mustang": "101" (row 914), "102" (row 916), "106" (row 918), "108" (row 920), and "109" (row 922). Column 908 contains the ratings for Result "A" associated with said result for said query for the session in corresponding row from column 902. For simplicity, each session is associated with a value for the rating on one interaction, although, in practice, each session will might have many interactions for said result related to said query. Some sessions even might not have any interactions associated with results. A rating of "1", in this example, means "not at all useful", and a rating of "5" is "very useful" for a rating system with a scale range of "1" to "5". Likewise, column 910 contains ratings for Result "B", and column 912 contains ratings for Result "C". Row 924 contains the average (mean) rating for each result using all sessions. Row 926 contains the average (mean) ratings for only sessions meeting the qualification "Mustang". For result "A", the average is "3.4" for all sessions and only "2" for sessions with the attribute Mustang. With the added search layer context, the end-user is able to determine that users who submitted the same query for sessions related to "Mustang", on average, did not find result "A" useful. Without the search layer lens, the average rating would suggest the result is moderately useful. For result "B", the average overall rating is "4.5", while the average "Mustang" rating is "4", lower than the overall average. For result "C", the average rating for all sessions is "4.3", while the average rating for sessions with the attribute "Mustang" is "4.6", greater than the overall average. If results are ranked based on average user ratings for the results, in a system that utilized data from all sessions, the results would be ordered: "B", "C", and "A", with "B" being first with its highest average rating score. However, when results are ranked according to the qualification of "Mustang", the order changes and is: "C", "B", and "A", with "C" being ranked first with its highest average rating for sessions related to "Mustang". FIG. 9 illustrates, by way of example, how search layer lens can utilize search layer context as a filter to refine results based on shared data on end-users' interactions. By utilizing evaluations from other users, the present invention is able to provide results that might better correlate to what the end-user might find useful based on what the actual end-user chooses as what he will find useful. By providing summarized data on users' interactions based on matched search layer qualifications the end-user selects, the end-user is better able to evaluate the relevance and/or significance of a result based on such collective intelligence.

Figure 10:
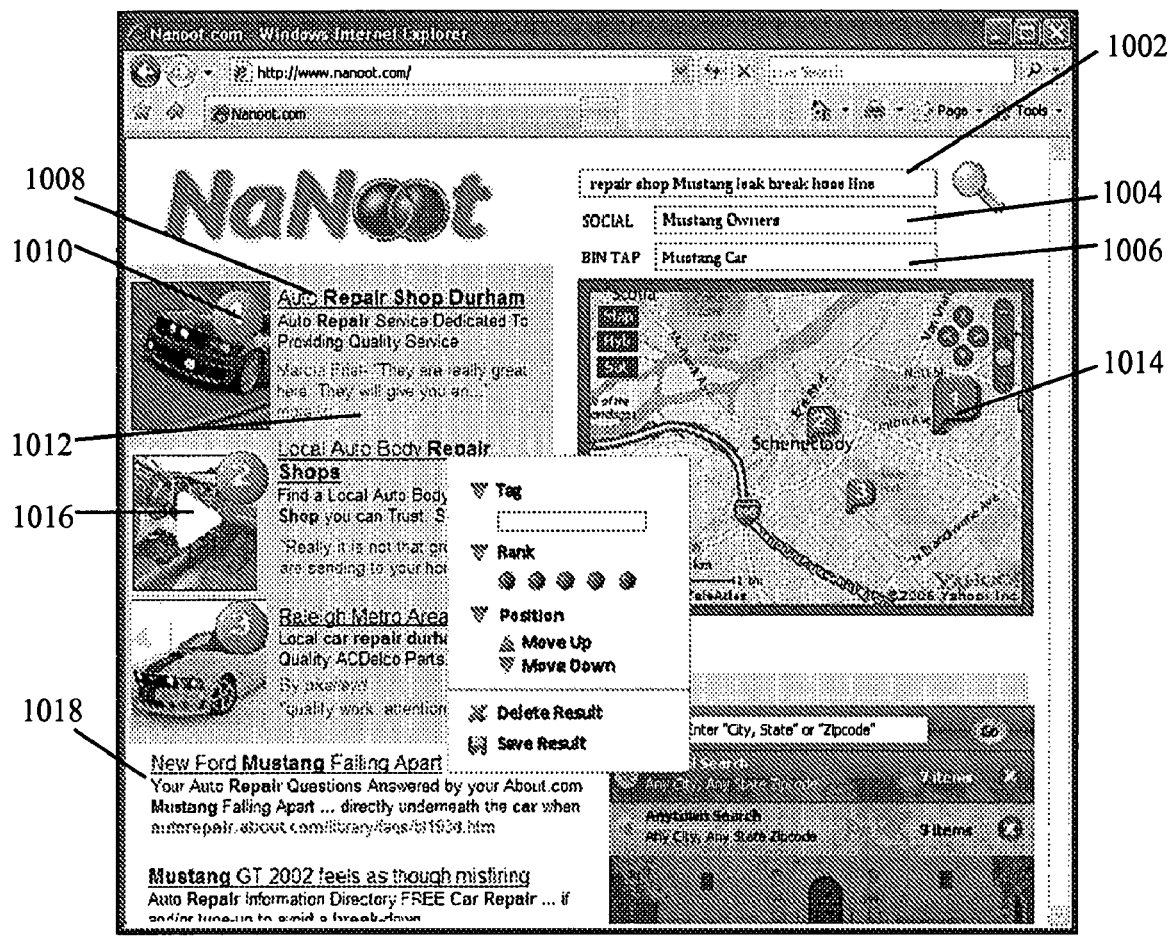
FIG. 10 is a screen shot of exemplary embodiment of search layer lens of the present invention

FIG. 10 is a screen shot of an exemplary embodiment for how a search layer lens might appear on a website intended for search utilizing methods herein. 1002 is a prompt for query string, as typically applied to search, which contains the query "repair shop Mustang leak break hose line". The illustration further includes a prompt for the search layer lens prompt entitled "Social" (1004). The query represented in 1004 is "Mustang Owners". Intelligence algorithms are provided in an embodiment to evaluate query criteria for intent as commonly used now. For example, "break" might be corrected to be "brake" or other means to associate works in the query string, such as associating keywords "repair" and "shop". The search layer lens also uses additional queries to refine search through the search layer lens based on qualifications associated with the query or similarly made query, which present systems do not integrate. The other prompt depicted in FIG. 10 is for "Bin Tap". In a further embodiment of search layer lens, attributes that can be applied as qualifications for a search layer bin, includes attributes of a "search layer bin." A search layer bin is very similar to common social sharing web sites in a web implement of methods herein, except search layer bin is fully integrated with the whole process of search through the method of search layer lens. Search on social sites usually provides search only for the sites and does not integrate multiple queries to find results outside of the context found within the pages. Search layer bins can also be applied to desktop search and streaming search as well.

In general, a search layer bin can comprise ROL results, text, links to web sites, pdf files, multimedia files, and other content usually described through Internet Media type as described by the World Wide Web Consortium (W3C). The attributes of content within the bin can be used as qualifications for the search layer lens as the search layer bin is associated with the search layer node in which said bin was created. A search layer node may have multiple bins. Search layer bins can be shared through the applying LACL, but the utility of the bin is not just social sharing, it is how they can be applied to refine search based on methods herein. Unlike Wikipedia "wiki", the search layer bin associates content with a particular search layer node and not just a "category". For example, a wiki has one page for one topic, which might have links to other pages with similar topics, but said topic only has one specific page, which must be "shared". A search layer bin allows users, for example, to have their own pages, in a web implement. A user can create his own content for private or public use. Squidoo "lens" works on the other extreme, providing pages to each user and/or group to share content. A query on a topic might pull up references for "lens" with content related to said query. However, with anyone contributing about anything, the system can eventually become overburdening. Rating systems on overall "lens" do not necessarily help with users evaluating a particular lens, as the majority might not represent the specific user. The query of search layer bin attributes is used in conjunction with the main query of the end-user. In FIG. 10, the search layer bin prompt is represented as 1006, which is specific to the attributes of the search layer bin. In the example illustrated, "Mustang Car" is provided. The end-user might be looking for results on how to repair his leak on his Mustang, and he is interested in what other Mustang owners deemed valuable on the specific topic of Mustang Car. The results provided for the search layer lens are represented in gray on the left side of the illustration (1008). The results in the gray represent ROL results that were saved by Mustang Owners into their search layer bin for a similarly made query, such as "brake hose line". The search layer lens can also be represented in one prompt so that the attributes could be for any associated search layer node and/or search layer bin. FIG. 10 depicts both for illustrative purposes only. This combined query should generate fewer results that are more specific to what a searcher may desire.

By adding other data, such as geospatial location, the query might only supply information on results that are located within a certain radius to the end-user, who might be on a cell phone waiting for his car to be towed. He might be looking for a mechanic to fix the leak in his brake hose line for his Mustang in an area he is not familiar with and is looking for someone who is proficient with his automobile. He can do a detailed search without having to be bombarded with too many results. Through a search layer bin, he could have quick access to a small snapshot of recommended results based on that particular query from many users input. The results depicted on his cell phone first would be the ones Mustang owners who saved the ROL result to their search layer bin, so therefore, most likely valued the result. A search layer bin can also contain text and other Internet media type content, such as pictures and video. In an embodiment of the present invention for search layer bin, the bins can be abridged and associated with particular results. In the illustration provided, 1012 is a textual abridgement of only one search layer bin, but more can be added if more search layer nodes are associated with a result. 1016 is a video found within the search layer bin that also contained the second result for the search layer lens query, demonstrating how different content can be provided and shared through search layer bins through the process of search itself, without having to "click" onto a bin.

The present invention also includes a means to provide "smart bins". Smart bins are a composite of a search layer bin. 1014 is a "smart bin" that composites the ROL results found in all bins related to said query and social search lens qualifications. In this example, the composite is a map. 1014 corresponds with 1010, which is the search layer bin that contained the result referred to on the smart bin. How a smart bin is displayed, what content is used, and how it is organized is based on rules applied.

By adding other data, such as geospatial location, the query can become even more specific. For example, the end-user might be on a cell phone waiting for his car to be towed in area he is not familiar with and is looking for someone who is proficient with his automobile who is located within a certain radius to the end-user, and, therefore, would know of a mechanic to fix the leak in his brake hose line for his Mustang. He can do such a detailed search without having to be bombarded with too many results. Through a smart bin, he could have quick access to a small snapshot of recommended results on a map (1014), which would be on the display of his mobile device. Not all smart bins have to be geographical maps.

1018 is another result that did not fit the search layer lens qualification, but did match the query "repair shop Mustang leak break hose line". The present invention allows for more than one query to be in the display, which allows more results to be presented to the end-user in case the search layer lens cannot provide results based on his qualifications and for more efficient search in general. In other embodiments, an end-user can have multiple, separate searches at the same time. For example, the end-user might the results for one session displayed at the same time as another session.

A further embodiment of search layer bins allows the placement of contextual ads within bins. The present invention through the search layer lens method provides more context in which an ad can be associated. Instead of just keywords or just content, advertisements can be placed in a more specific context, especially in a "smart bin". People have a natural tendency to want to "tune out" noise, and ads, even current contextual ads, are tuned out by many users. For example, solicitation through email has become over burdensome, even with "opt-in" mail. People easily disregard "junk". With "sponsored ads" for web sites, people can generate a tendency to disregard the ad as they do not necessarily match the intention of their search. In other words, the ad is ineffective because the end-user is "not in the market" for the product or service associated with said ad. "Sponsored ads" strategy is to try to gain exposure with many people who might find their product or service valuable based on the query. Through the search layer lens, the context becomes very specific, and therefore, the ads can be placed in more narrowly defined context. Moreover, in another embodiment, the advertisement can be a search layer bin. To prevent abuses of "search placement" strategies, organizations wanting to place ads are able to provide an advertisement bin with their tailored content. Their ad only appears when said ad is relevant to end-user's specific search. Policies would regulate said organizations creating "non-commercial" bins for "commercial purposes. With methods herein, for example, result 1014 and 1010 might be an advertising bin for a particular mechanic in the area who is also a Mustang owner. He benefits from receiving first placement since he fit the qualification exactly. The end-user benefits by receiving results on his intent, which the bin might have even included a discount. The present invention further provides greater probability that ads are matching end-users. The search layer bin is a way for users to share content that is decentralizing, yet can be narrowly defined.

Search layer bins can be also be applied for a single user. A search layer bin provides more refined search than session alone, because results provided are only those in saved folders, "search layer bins". But, unlike "lens", "channels", or "smart folders", just to name a few, an end-user doesn't have to actually look in the folder to get the results they need; however, they are provided the folder for more content if they want. A search layer bin is a multi-dimensional "folder" where content can be in corridors rather than pages. Sub-bins can be contained in a search layer bin and can be placed within content, since content are representations. For example, a word in text for a project might contain an annotation that is a sub-bin, containing further content and results, which can further contain another sub-bin with results. Instead of just the usual display of folders within folders, the search layer bin is content within content. But, unlike smart folders or channels, with methods herein, a search can contain other results not necessarily contained within the search layer bin themselves. For example, 1018. While search can be applied to the mentioned above examples, they are not dynamic when a query is changed. Search under search layer bins allows for flexibility to change the query, so the search layer lens qualification might be the same, but the main query changes, or the main query stays the same, but the search layer lens changes. Search layer bins are integrated with search seamlessly to provide more efficient way for users to evaluate results. Search layer bins (including smart bins) can also be streamed, and people can be notified of modifications.

While session layer prioritizes the end-user in search, the group layer prioritizes group identity in the presentation (display) of results. A group layer provides group-awareness in query results, providing search collaboration aimed at a common purpose shared by a plurality of end-users. In other words, recognizing also that some searches are guided by "group intent", the present invention facilitates collaboration within search systems based on end-users' differentiated, uniquely identified groups, whereby results provided for a query for a particular group can account for interactions made by a plurality of end-users of said particular "group", or, in some embodiments, combination of "groups" (through search node binding), thus producing group-based social awareness in the search system. Examples where group layer can be applied include, but are not limited to, academic or enterprise research, news tracking for specific use, or event planning and organizing. The group layer (GL) provides unique identity to a particular group represented in the system and identifies particular end-users who are members of said group. While technologically a "group" can consist of only one member, generally a "group" consists of two or more unique end-users who are identified as members of a cohesive unit. "Cohesive" refers to all members being strongly interconnected. In other words, each member is linked to another member by virtue of said group identity. Each node is considered dependent and falling within said group. Groups can be formed, for illustration only, working groups, civic organizations, schools, and familial ties. A group layer facilitates greater synchronization of result data among members of a group and can reflect the interactions on results from a plurality of end-users.

End-users must have an identity to be included in a group; however, "unique" identity is not necessary. Other embodiments of the present invention may integrate GL with user layer and assign unique identity to end-users to facilitate interactions being associated with particular end-user. The GL, however, associates interactions made by end-users with group identity. While each node has identity to be associated with a group, the group identity has precedence in the system to affect how and which interactions are represented to a particular group. Methods employed to "elect" membership into a group depend on the particular means of providing layer access control list (LACL). Administrators utilizing a prompt through the IRL of the system may pre-sort end-users based on specific roles, such as and by example only, "classroom assignment", "working group", or "meeting section", to create specific groups. Other methods may allow individual end-users to create groups in which they are the "facilitator" or "moderator" through prompts in the IRL. Other members may be invited to "join" or ask permission to "join" from the moderator. Other methods for group assignment not disclosed herein may be utilized to assign individual end-users to a group or plurality of groups.

Applying to FIG. 2 to group layer, end-user (206), for an exemplary embodiment of GL, logs on to a group search. Through rules, for example, the end-user can be automatically assigned to the appropriate group upon login, or, another example, the end-user chooses a group through a prompt in the IRL. Identity is established through the group layer (212), or it can be provided by the user layer in an integrated embodiment. GL (212) uses identity of the user (210) in order to determine the group and/or groups in which the user is a member. In some embodiments, end-users do not necessarily elect themselves into a group, such as with students or employees. While the GL does not require end-users to have "unique" identity in the system, the user must have an identity in the system to ensure access into a group or to restrict said access. The identity is used to retrieve data regarding group membership from the group store (214), and this data (210) is provided to the IRL (202) as feedback. A user layer would further allow associations of interactions with specific users. The GL prioritizes group identity over user identity. To integrate these two layers, rules can be provided through layer interaction control list (LICL) to govern the priority of interactions across search layers. In an embodiment where an end-user may belong to multiple groups, the IRL (202) may provide a prompt (204) for the end-user to select the group in which the search is to be associated. Once a group (or groups) is selected, interactions for results (220) from query (216) are associated with corresponding group identifier in the ROL (224). The present invention further provides means to allow the synchronization of display for two or more users, which is useful for two or more members of the same group conducting group searches.

The ROL (224) iterates through the results performing all interactions associated with said result corresponding to said group identity. Some embodiments of the present invention may allow end-user to interact with results without affecting results for the entire group, in which case, the ROL would subsequently could bind search layer nodes for both user layer and group or layer one over another (iterate through one layer first and then the other) to perform interactive operations for RAILD depending on the rules provided by LICL.

There are two primary embodiments for group-based search: egalitarian and hierarchical. For an egalitarian embodiment, all end-users are able to perform any interactions facilitated by the specific embodiment of the present invention to affect group data. In other words, all interactions associated with members of a group are associated with group identity so all interactions for a particular result are reflected to all members of said group. All interactions end-user 206 elects through a prompt in the IRL (202) are associated with group identity for group in which end-user 206 is conducting the search for, and, for some embodiments, is also associated with the end-user's identity. When any member of said group performs a query, past interactions performed by other members of said group are taken into account through the ROL (224), which performs operations to reflect said interactions of the entire group and provide results to the IRL (202) which displays results to said end-user (206). Some embodiments of the present invention may take into account "conflicting" interactions, such as ratings and rankings, through means of compositing and/or summarizing interactions. For example, members might be able to view deleted items associated with other members. In egalitarian group embodiments, all members are able to perform group layer commands as well. Group commands are performed in group layer and facilitate the group layer. Example can include, for illustration only and are by no means exhaustive or all inclusive: "join", "leave", "open", and "close".

In a hierarchical model, certain privileges are granted to some members to affect group data or perform group commands and not to others. In other words, not all users are able to perform interactions on results that are associated with group identity. The layer interaction control list (LICL) controls access to perform interactive operations associated with a search layer. Moreover, the hierarchy can also include privileges associated with commands governing a group, such as and by example only, presiding over the group or accessing group and/or user data. Specifically, some end-users in an exemplary embodiment may have privilege to control who can join the group, or certain end-users may have privilege to view results others deleted. A layer command control list (LCCL) control access to perform commands associated with a search layer. A LQCL controls access to perform queries associated with a search layer.

Figure 11:
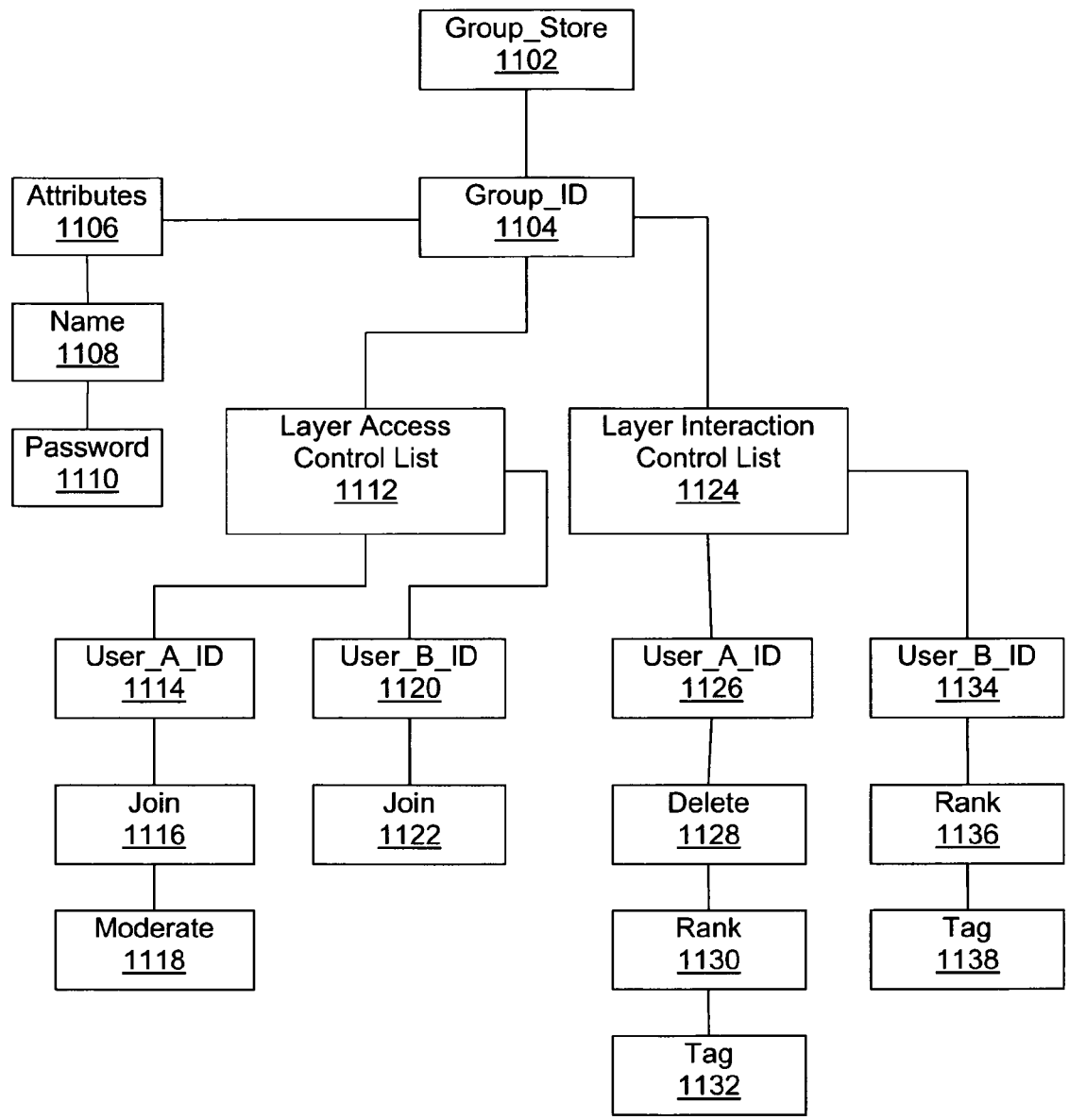
FIG. 11 illustrates exemplary embodiment of layer access control list (LACL) of the present invention; and, FIG. 12 is a table depicting exemplary embodiment of group layer method of the present invention.

FIG. 11 illustrates an exemplary embodiment of group layer (GL) data structures to facilitate LACL. Data necessary to facilitate group-based search is stored in a group store (1102). Data associated with similar group identity may be shared across clients to enable group-based search. Group identity is assigned in this example utilizing a "Group_ID" (1104), which is unique so as to identify a particular group from a plurality of groups. For illustrative purposes only, the group identifier (1104) may also be associated with other attributes (1106), such as "Name" (1108) for the particular group and "Password" (1110) for the group to provide additional security for group access. Other LACL rule might require each individual end user having a unique password to enter the system, which automatically grants said end-users into the groups in which he or she is associated. Security measures are not required by the present invention and are obvious for group conducting searches requiring security measures. Security measures are generally recommended, especially when sensitive information is being shared. Such data for group security could be stored in the group store or through other ordinary means.

The layer access control list (LACL) (1112) controls access to a specific search layer or multiple search layers. In this example, LACL is used to control access to group layer. The LACL/LCCL (1112) applied to GL controls group membership, access to group data (LACL), and the privileges of the members to perform group layer commands (LCCL), such as "join" (1116 and 1122). The LACL, in some embodiments, includes a list with users' roles and privileges associated with said roles. Group 1104 has only two members, "A" and "B", corresponding to the unique identifiers for end-users "A" (1114) and "B" (1120). Again, GL does not require unique identity for members. The LACL may alternatively include roles, such as "student" or "teacher", that permit access to said group and privileges. Roles can be associated with privileges. Both end-user "A" (1114) and end-user "B" (1120) are granted with the privilege to perform the command "join" (1116 and 1122 respectively). The exemplary embodiment of group command to "join" provides access to a group the end-user wants to join. The privilege "join" means that a particular user has the privilege to access data associated with said identified group.

Depicted in FIG. 11 is also the privilege "moderate" (1118) to end-user "A" (1114). An end-user with the role of moderator would have privileges to moderate group membership, which may include group commands not available to other members, such as denying group access. Alternatively, an administrator could perform functions of "moderation" without actually being a member of a group. Specific privileges associated with moderation depend on the rules of layer command control list (LCCL). "Group commands" are the actual operations, while "privileges" represent what a particular identified user has approval to perform such command. Roles, as only one example, can be established through rules and further facilitate access control in the GL. Which commands a particular end-user may perform or are restricted to is established by way of what role the end-user is assigned to in LCCL and the privileges associated with said role.

The layer interaction control list (LICL) (1124) contains the privileges of each end-user to interact with particular results in association with a given layer. The LICL can provide rules regarding interactions with results for multiple layers. For example, in a system that is group-aware and also end-user aware (i.e., establishes GL and user layer), the LICL may control interactions for both layers. For example, an end-user might have privilege to delete items only for him but not for the entire group. In a hierarchical group layer embodiment, some interactive operations may be reserved only for a few members, such as "delete" (1128), in which only user "A", identified by his "user_ID" (1126), is able to perform in this example. End-user "A" is also able to "rank" (1130) and "tag" (1132) results for the entire group. End-user "B" (1134) is also able to "rank" (1136) and "tag" (1138) in association with the entire group. Interactive operations shown in FIG. 11 are by no means all inclusive or exhaustive. The LICL (1124) is utilized in a hierarchical embodiment of the GL to primarily control privileges of members to interact with results in association with group identity, and, therefore, group data.

A layer query control list (LQCL) provides query control for a search layer node. How query control is permitted for a certain search layer nodes depends on the established rules for LQCL. While some methods are able to block particular results and filter content. The LQCL goes further to block queries or "contain" queries. For example, a teacher might have prompts established so a certain keyword must be in the query string to keep students on task. The LQCL could also be used, for example, as a way for end-users to control what queries should be associated with their search, if for example, some searches they do not want to have associated with them.

FIG. 12 is a table of simulated results for two groups "ABC" and "XYZ" in an exemplary GL embodiment of the present invention. Column 1202 contains the group ID for both groups. The group unique identifier in this case is the represented by the names of the groups "ABC" and "XYZ". Each group has two members represented in column 1204. Group "ABC" has members "Ted" and "Ned", while group "XYZ" has members "Jan" and "Fran". For simplicity, this example assumes that only five results exist and only one query is made by all four users to the system. However, group awareness, just as end-user awareness, is not dependent on the query. Associations are made for the group identity and result identity for the interactions. A use for group aware only systems would be for search systems applied to a single scope, such as property search, occupational recruiting, or event planning/coordinating. However, in preferred embodiments, the group layer would be integrated with other search layers, such as session layer. Column 1206 shows the five ROL results in the order they are displayed to the end-user depicted in column 1204. For the first iteration of results, the order of results for both end-user "Ted" in group "ABC" and end-user "Jan" in group "XYX" is: "R1", "R2", "R3", "R4", and "R5". Column 1208 depicts the interactions made by end-user "Ted" and end-user "Jan" for the first set of ROL results. In row 1216, "R1" is deleted. In row 1218, "R2" is deleted. In row 1220, "R5" is ranked to the first position and the end-user added a comment. Contrarily, end-user "Jan" deletes "R3" (row 1224) and "R4" (row 1226). Column 1210 depicts the second iteration of results for the same query made by the second member of each group for simplicity of illustration. For end-user "Ned", results are displayed in the following order: "R5", "R3", and "R4". "R5" is also displayed with the comment made by end-user "Ted". The results are displayed to end-user "Fran" in the following order: "R1", "R2.", and "R5". "Ted's" comment is not included for "R5" for "Fran" (row 1232). Column 1212 depicts the interactions by the second members of groups "ABC" and "XYZ". End-user "Ned" is denied access to interact with results for group use through LACL comprising LICL. In some embodiments, the end-user may be able to interact with results, but those interactions are only applied to the particular end-user's data. End-user "Fran" comments on "R1" (row 1228) and deletes "R2" (row 1230). Finally, column 1214 depicts the third iteration of results displayed. The display for end-user "Ted" contains the results in the following order: "R5" with comment, "R3", and "R4". If no interactions are performed by "Ted", then this would be the same display for end-user "Ned". The display for end-users "Jan" contains results "R1" and "R5" in the respective order. "R1" also contains the comment made by end-user "Fran" (row 1222). If no interactions are performed by "Jan", then this would be the same display for end-user "Fran".

FIG. 12 demonstrates how result data are separated according to group interactions to optimize search for each particular group. The present invention is "aware" of group interactions (present and/or past) made by the plurality of individual end-users composing said group and can incorporate a plurality of said interactions that currently work independently of one another.

A benefit of group-aware search is multiple end-users are able to swarm searched items. Also, multiple people are able to access and interact with searched items for particular group use without the interactions affecting data for other groups. The GL allows for better project management in association with search as "snapshots" of searched items in a database can be made for particular groups so similarly made queries generate results more specific to said group. For example, working group "A" may find useful files "100" and "200", while working group "B" may find files "200" and "300" useful. The same query from both groups would generate different results even though both groups may have access to all three files. Further, groups do not have to create multiple "streams" for results for each query, but share one "stream" for a related group endeavor. When group layer utilizes funnel method, the group member can just enter a query and know what other group members thought about results without them having to "post" or "send" results. The group layer is best to handle small groups of users who have strong relationship ties to the group in which they are a member. Each node does not necessarily need to personally know every other node; however, a "strong tie" exists between node and group. For example, a student from one classroom might not necessarily know a student from another classroom; however, what is vital is that student's relationship to the larger "group", in this case the school. The group layer is best at synchronizing results for members of a group when group identity is the priority. This does not imply that all results will be the same for every user; however, it does mean that all interactions associated with group are equally applied to all group members of said group.

The system of the present invention is comprising: one or more computing devices providing methods described herein and a search engine providing results. A computing device is a device with its own computing processor or is connected to another computing device having its own processor and providing computing capabilities for said connected device. The present invention also takes into account methods commonly known as "virtualization", or a server projecting computer methods to a remote client (e.g. slim clients connected to servers). such as, for example, slim clients connected to a remote server. A client only embodiment providing a search engine and can be either: a client that is not networked to other computing devices for methods herein (e.g., desktop search or application with file search); two clients networked together (i.e., peer-to-peer); or, a client connected to a server only providing results (e.g., "search bot"). A client/server embodiment of the present invention comprises at least two computing devices interconnected over a network, such as the Internet, Intranet, or peer-to-peer. One embodiment can be slim client can be connected to a server providing methods described herein, and said server can either provide the search engine or is connected to a least one server providing the search engine. Another embodiment can be a client and server both sharing functions of methods described herein, and said server can either provide the search engine or is connect to a least one server providing the search engine. One or more computing devices may be introduced to the system that only provides storage (e.g., database management system, flash memory, or hard drives) depending on the implement of the present invention. A further embodiment of the present invention includes at least one computing device having a device for frequency (e.g., GPS receivers, optical scanners, RFID readers) and/or biological input (e.g. devices for blood pressure, heart rate, blood sugar levels, blood type, DNA, retina scans, fingerprint). The above examples provided are for illustrative purposes only, and are not all inclusive or exhaustive.

The apparatus of the present invention is a device which provides methods disclosed herein. In a preferred embodiment, the device is hard coded for methods described herein in whole or in part. Scalable systems entail a vast number of interactions, which require a lot of CPU cycles. Offloading some methods to said device will improve the quality of service the system can provide. A further embodiment is a device to specifically store RAILD, for example only, storing interactions associated with said device. The apparatus of the present invention can further include devices to input and interpret frequency signals or biological input. These further devices provide the apparatus with contextual data. The apparatus can further include a device to network, especially with other computing devices to provide data or for offloading computer-implemented methods. The apparatus can further include in some embodiments, a computer processor, which is useful for processing methods described herein, especially for a server providing methods herein. The apparatus can further include a display and a device for end-user input, so said device can be used as a stand alone system or a client. A search engine can also be included on the server, stand alone system, and a client.

Having thus described our invention, what we claim as new and desire to secure by Letters Patent is as follows:

1. A search system to provide and display interaction with query results that provides end-user awareness, social awareness, contextual awareness, or combination thereof in said results utilizing a layered approach comprising:
   (A) at least one search engine or at least one database or combination thereof providing results in response to query, herein referred to as "result provider";
   (B) at least one search layer node that provides nodal awareness in display of query results that comprises:
   (i) group layer component that provides group awareness comprising:
      (a) establishing or assuming unique identity for a particular group;
      (b) group store that stores and retrieves Result Associative Interactive Layer Data (RAILD) by group said identity;
      (c) layer access control list (LACL) component that grants, denies, or restricts access to end-user for particular search layer node; or,
   (ii) session layer component that provides session awareness in the display of query results comprising:
      (a) establishing or assuming unique identity for a particular session;
      (b) session store that stores and retrieves RAILD by session said identity;
      (c) session commands using unique static command identifier per command; or,
   (iii) group layer or session layer combined with user layer component that provides end-user awareness comprising:
      (a) establishing or assuming unique identity for a particular end-user from a plurality of search layer nodes;
      (b) user store that stores and retrieves RAILD by end-user said identity; or
   (iv) any combination of group layer, session layer, or end-user layer, wherein each search layer node is uniquely identified from plurality of search layer nodes;
   (C) Interactive Result Layer (IRL) component comprising:
      (i) at least one display device that presents query results and Result Operation Layer (ROL) results or only ROL results;
      (ii) interface means to prompt for at least one query;
      (iii) interface means to prompt end-user to input data for at least one interactive operation of deletion or deletion and plurality of interactive operations for particular displayed result or any attribute thereof;
      (iv) means to accept and present ROL results from step (D)(ii)(i);
      (v) input device with means to facilitate end-user interactivity with said particular displayed result or said any attribute thereof;
      (vi) means to encapsulate said input data with predefined static interactive operation identifier, said ROL result, at least one search layer node, said association herein called "result associative interactive layer data" (RAILD) to enable conversion of query results into ROL results in ROL (D)(ii);
      (vii) means to accept and output RAILD for loopback feedback (E);
      (viii) means to synchronize display of at least one ROL result on said display device to perform omission, addition, relational or absolute position change, spatial coordinate change or visibility change of said particular displayed result or alteration of attribute or addendum to attribute of said particular displayed result in order to reflect said interactivity by search layer node with said particular displayed result using said RAILD;
   (D) Result Operational Layer (ROL) component comprising:
      (i) at least one database to store and to retrieve unique identifier of said particular displayed result and at least one attribute of particular displayed result, herein referred to as "ROL result data," and RAILD, wherein said ROL result data and said RAILD are utilized in current and subsequent queries or persistent queries or combination thereof;
      (ii) at least one processor to automatically convert query results into ROL results in real-time comprising steps to:
         (a) obtain and organize query results from said result provider;

(b) uniquely identify each query result using at least one attribute from said result to utilize in steps (d), (e), and (g);

(c) obtain or assume unique identifier of search layer node for steps (e) and (g);

(d) iterate said query results and set particular query result in iteration for building interactive operation command list (IOCL) in step (g);

(e) obtain and organize ROL result data and RAILD data for building list of commands step (g);

(f) bind RAILD data containing coincident interactive operation identifier for said ROL result based on at least one rule to create composite interactive operation command list (IOCL);

(g) build interactive operation command list (IOCL) by aggregating said RAILD, said unique identifier of said ROL result, said unique identifier of said search layer node, at least one attribute of said query result in iteration, and said ROL result data;

(h) process said IOCL by iterating said IOCL and set particular command in iteration, evaluate predefined static operation identifier of said command in iteration to perform interactive operation, and perform said interactive operation based on said operation identifier of said particular command in iteration that represents omission, addition, relational or absolute position change, spatial coordinate change, visibility change, alteration of attribute, or addendum to attribute of said query result in iteration;

(i) provide output, herein referred to as "ROL result", to IRL;

wherein said steps to automatically convert query results into ROL results to reflect end-user real-time interactivity with displayed results to provide nodal awareness is accomplished without having to save, delete, or modify actual said query results from result provider;

(E) loopback feedback that facilitates bi-directional data transfer among said at least one search layer node, said IRL, and said ROL in at least one computing device;

wherein end-user, social, contextual, or combined awareness in the display of ROL search results is accomplished through said loopback feedback among said at least one search layer node, said IRL, and said ROL.

2. The search system of claim 1, wherein IRL display device (C)(i) and input device (C)(v), further comprising display overlay (tactile) device that converts touch or movement as input to at least one prompt.

3. The search system of claim 1, wherein IRL prompt (C)(ii) or (C)(iii), further comprising audio device that provides audio prompt.

4. The search system of claim 1, wherein IRL display device (C)(i) and input device (C)(v), further comprising optical three-dimensional interactive display device.

5. The search system of claim 1, wherein IRL input device (C)(v), further comprising audio device that converts sound as input.

6. The search system of claim 1, wherein IRL input device (C)(v), further comprising input optical device.

7. The search system of claim 1, wherein ROL conversion step (D)(ii), further comprising automatically adding or removing an interactive operation command in the interactive operation command list (IOCL) (D)(ii)(g) comprising steps to:

(A) associate content based on aggregated RAILD, unique identifier of ROL result, unique identifier of search layer node, at least one attribute of query result in iteration, and said ROL result data;

(B) insert or delete an interactive operation command to or from said IOCL.

8. The search system of claim 1, further comprising real-time automatic result feeder (ARF).

9. The search system of claim 1, wherein loopback feedback that facilitates bi-directional data transfer among said search layer node, said IRL, and said ROL, said loopback feedback is in real-time.

10. The search system of claim 1, wherein at least one search layer node that provides nodal awareness in display of query results, further comprising search layer commands for at least one search layer, comprising:

(A) at least one search layer command using a static unique identifier;

(B) IRL prompting for at least one search layer command, encapsulating and organizing input data from said at least one search layer prompt, and associating said static unique identifier of said search layer command (C) ROL performing actual layer command using said static unique identifier and said input data.

11. The search system of claim 1, wherein IRL (C)(i) display device presenting results and ROL (D)(ii) converting query results into ROL results, further comprising means to simultaneously display ROL results associated with at least two different search layer nodes for same query.

12. The search system of claim 1, wherein IRL (C)(i) display device presenting results and ROL (D)(ii) converting query results into ROL results, further comprising means to simultaneously display results associated with at least two different search layer nodes for different queries.

13. The search system of claim 1, wherein IRL (C)(i) display device presenting results, further comprising means to synchronize IRL displays for one or more search layers for at least two display devices.

14. The search system of claim 1, wherein the layer access control list (LACL), further comprises layer command control list (LCCL) that grants, denies, or restricts end-user from performing a layer command.

15. The search system of claim 1, wherein the layer access control list (LACL), further comprises search layer interaction control list (LICL) that grants, denies, or restricts an end-user from performing interactive operation in association with particular search layer node.

16. The search system of claim 1, wherein the layer access control list (LACL), further comprises search layer query control list (LQCL)—that grants, denies, or restricts particular search layer nodes from accessing results for particular query.

17. The search system of claim 1, wherein the layer access control list (LACL), further comprising means to provide IRL means to provide or omit one or more prompts in accordance with layer access control list (LACL).

18. The search system of claim 1, wherein RAILD binding in ROL (D)(ii)(f), further comprising storing composite interactive operation command list (IOCL) in association with at least one search layer node.

19. The search system of claim 1, wherein RAILD binding in ROL (D)(ii)(f), further comprising summarizing interactive operations for IOCL and summary data to IRL for display.

20. The search system of claim 1, wherein RAILD binding in ROL (D)(ii)(f) and IRL, further comprising IRL prompt for criteria to apply to at least one rule to create composite interactive operation command list (IOCL); and ROL using said criteria.

21. The search system of claim 1, RAILD binding in ROL (D)(ii)(f), further comprising intelligence algorithms initiating RAILD binding for multiple search layer nodes.

22. The search system of claim 1, wherein RAILD binding in ROL(D)(ii)(f), further comprising the means to apply intelligence algorithms to at least one rule for creating composite IOCL.

23. The search system of claim 22, wherein means to apply intelligence algorithms, further comprises Bayesian probabilities.

24. The search system of claim 1, wherein ROL (D)(ii)(f), further comprising means to bind two or more search layer nodes comprising steps to:
  (A) identify two or more search layer nodes;
  (B) associate said search layer nodes;
  (C) provide at least one rule for how RAILD is associated with at least one search layer node; and,
  (D) associate bound RAILD with said search layer node in accordance with said rule.

25. The search system of claim 24, wherein at least one rule for how RAILD is associated with at least one search layer node, said search layer node further comprises hybrid search layer node that combines two or more search layer nodes and is provided unique identity.

26. The search system of claim 24, wherein at least one rule for how RAILD is associated with at least one search layer node, further comprises steps to provide and store hierarchical structure for at least two or more search layer nodes.

27. The search system of claim 24, wherein at least one rule for how RAILD is associated with at least one search layer node, said search layer node further comprises a ghost search layer node created for the purpose of binding RAILD.

28. The search system of claim 24, further comprising means of IRL prompt for end-user to select two or more search layer nodes to bind.

29. The search system of claim 28, wherein two or more search layer nodes, said search layer nodes have at least one common search layer.

30. The search system of claim 28, wherein two or more search layer nodes, said search layer nodes do not have at least one common search layer.

31. The search system of claim 1, wherein IRL (C)(vi) and ROL (D) are concerned, further comprising steps to associate, process, and store at least one query with search layer node in RAILD in which said at least one query is submitted.

32. The search system of claim 31, wherein processing at least one query with search layer node in RAILD, further comprising intelligence algorithms that evaluate intent of said at least one query.

33. The search system of claim 31, wherein steps to associate, process, and store at least one query with search layer node in RAILD, further comprising steps to associate, process, and store contextual data provided during query.

34. The search system of claim 33, wherein contextual data provided during query, comprises at least one device for receiving and interpreting biological input.

35. The search system of claim 33, wherein contextual data provided during query, comprising at least one device for receiving and interpreting frequency input.

36. The search system of claim 33, wherein contextual data provided during query, comprising at least one device for optical input.

37. The search system of claim 33, wherein contextual data provided during query, comprising device for providing geospatial location.

38. The search system of claim 33, wherein contextual data provided during query, comprising at least one device for inputting and interpreting biological metrics that are physiological.

39. The search system of claim 33, wherein contextual data provided during query, comprising electronic marker in an audio or video file.

40. The search system of claim 33, further comprising prompt to exclude or include contextual intelligence for query.

41. The search system of claim 31, wherein steps to associate, process, and store at least one query with search layer node in RAILD, further comprising funneling results through creating hybrid search layer node by binding two or more search layer nodes with partially or fully matched query in RAILD.

42. The search system of claim 41, wherein binding two or more search layer nodes with partially or fully matched query, further comprising search layer lens to provide search layer context for said partially or fully matched query, comprising:
  (A) qualification for providing search layer context comprising at least one attribute of profile associated with particular search layer nodes; and,
  (B) IRL prompt for one or more qualifications and
  (C) associating one or more qualifications—in RAILD.

43. The search system of claim 42, wherein IRL prompt for one or more qualification, further comprising intelligence algorithms to determine relevant attributes to use as qualifications for providing search layer context.

44. The search system of claim 42, wherein qualification for providing search layer context comprising at least one attribute of profile associated with particular search layer nodes, further comprising attribute of search layer bin associated with search layer node, said search layer bin comprising:
  (A) content of at least one Internet media type;
  (B) content editing for said at least one Internet media type;
  (C) unique identifier for said search layer bin;
  (D) storing and retrieving said content from at least one database, wherein said content can be accessed in current and subsequent queries or persistent queries or combination thereof;
  (E) search layer commands associated with said search layer bin; and,
  (F) at least one rule for organizing content in said search layer bin such that attribute of said search layer bin can include attributes associated with content within said folder.

45. The search system of claim 44, wherein storing and retrieving said content from at least one database and search layer commands associated with said search layer bin, further comprising steps to:
  (A) "save" ROL result in association with search layer node and query in which search layer command "save" was performed;
  (B) create RAILD for said ROL result, said search layer node, said "save", and any attributes thereof; and,
  (C) display said ROL result in said search layer bin.

46. The search system of claim 44, wherein search layer commands associated with said search layer bin, further comprising
  search layer command to facilitate hierarchical structure to two or more search layer bins such that "sub-bin" is contained within parent search layer bin.

47. The search system of claim 46, wherein sub-bin further comprises anchor in parent search layer bin that is annotation of sub-bin.

48. The search system of claim 44, further comprising interactive map.

49. The search system of claim 44, further comprising at least one advertisement in search layer bin based on content of said search layer bin.

50. The search system of claim 44, said search layer bin is advertisement.

51. The search system of claim 44, wherein content editing for said at least one Internet media type, further comprises automatic notifications when search layer bin has been modified.

52. The search system of claim 44, wherein storing and retrieving said content from at least one database, further comprises providing content of one or more search layer bins to a client.

53. The search system of claim 44, further comprises a "smart bin" that composites content of two or more search layer bins by providing at least one rule to composite said search layer bins.

54. The search system of claim 44, further comprising abridging search layer bin content and associating said search layer bin content abridgment with ROL result.

55. The search system of claim 1, wherein loopback feedback that facilitates bi-directional RAILD data transfer between IRL and ROL in at least one computing device, said computing device is at least one server dedicated to search comprising ROL connected to network; at least one computing device that is a computer client comprising IRL connected to said server through said network; and, loopback feedback between said IRL and said ROL utilizing said network.

56. The search system of claim 1, wherein loopback feedback that facilitates bi-directional RAILD data transfer between IRL and ROL in at least one computing device, said computing devices are client devices networked together.

57. The search system of claim 1, wherein loopback feedback that facilitates bi-directional RAILD data transfer between IRL and ROL in at least one computing device, said computing device is a server dedicated to search, comprising at least one network interface device to provide at least one client computing device IRL (C)(ii), (C)(iii), (C)(vi), and (C)(vii).

58. The search system of claim 1, wherein loopback feedback that facilitates bi-directional RAILD data transfer between IRL and ROL in at least one computing device, said device is a client device.

59. A computing apparatus according to claim 1 to provide contextual awareness, end-user awareness, social awareness, or combination thereof in search using a layered approach comprising embedded result operational layer (ROL) processor and network interface device to connect to at least one search engine or at least one database or combination thereof.

60. The computing apparatus of claim 59, further comprising processor with embedded automatic result feeder (ARF); and, interactive result layer (IRL).

61. A computing apparatus of claim 59, further comprising processor with embedded automatic result feeder (ARF) and interactive result layer (IRL).

62. The computing apparatus of claim 61, further comprising at least one device to input and interpret frequency input.

63. The computing apparatus of claim 61, further comprising at least one device to input and interpret biological input.

64. The computing apparatus of claim 61, is a peripheral device.

* * * * *